Oct. 29, 1935.  N. RUBIN  2,019,465
STOCK CUTTING MECHANISM
Filed Nov. 11, 1932   14 Sheets-Sheet 1
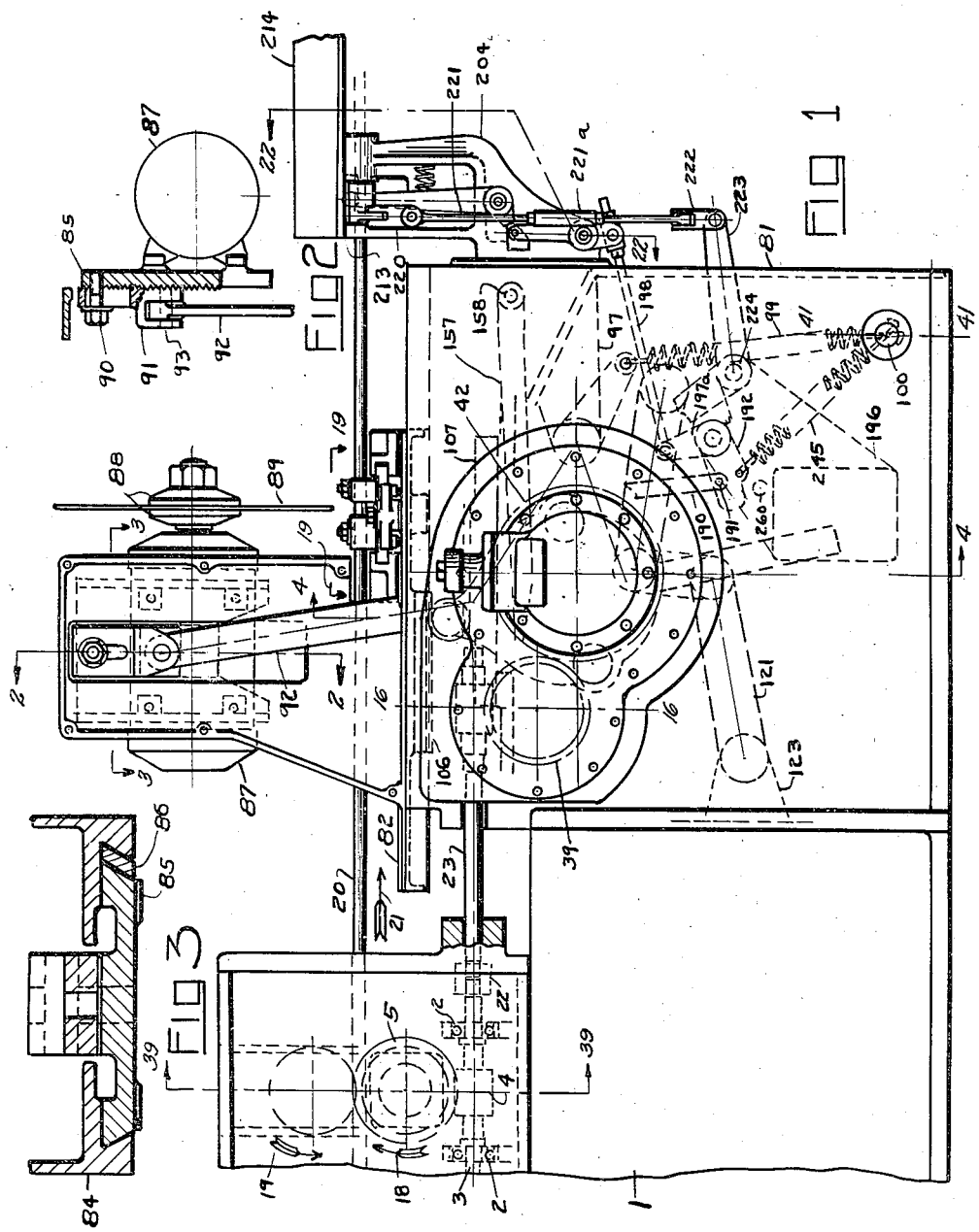
INVENTOR
Norbert Rubin
BY Richey & Watts
ATTORNEYS Oct. 29, 1935.  N. RUBIN  2,019,465
STOCK CUTTING MECHANISM
Filed Nov. 11, 1932  14 Sheets-Sheet 2
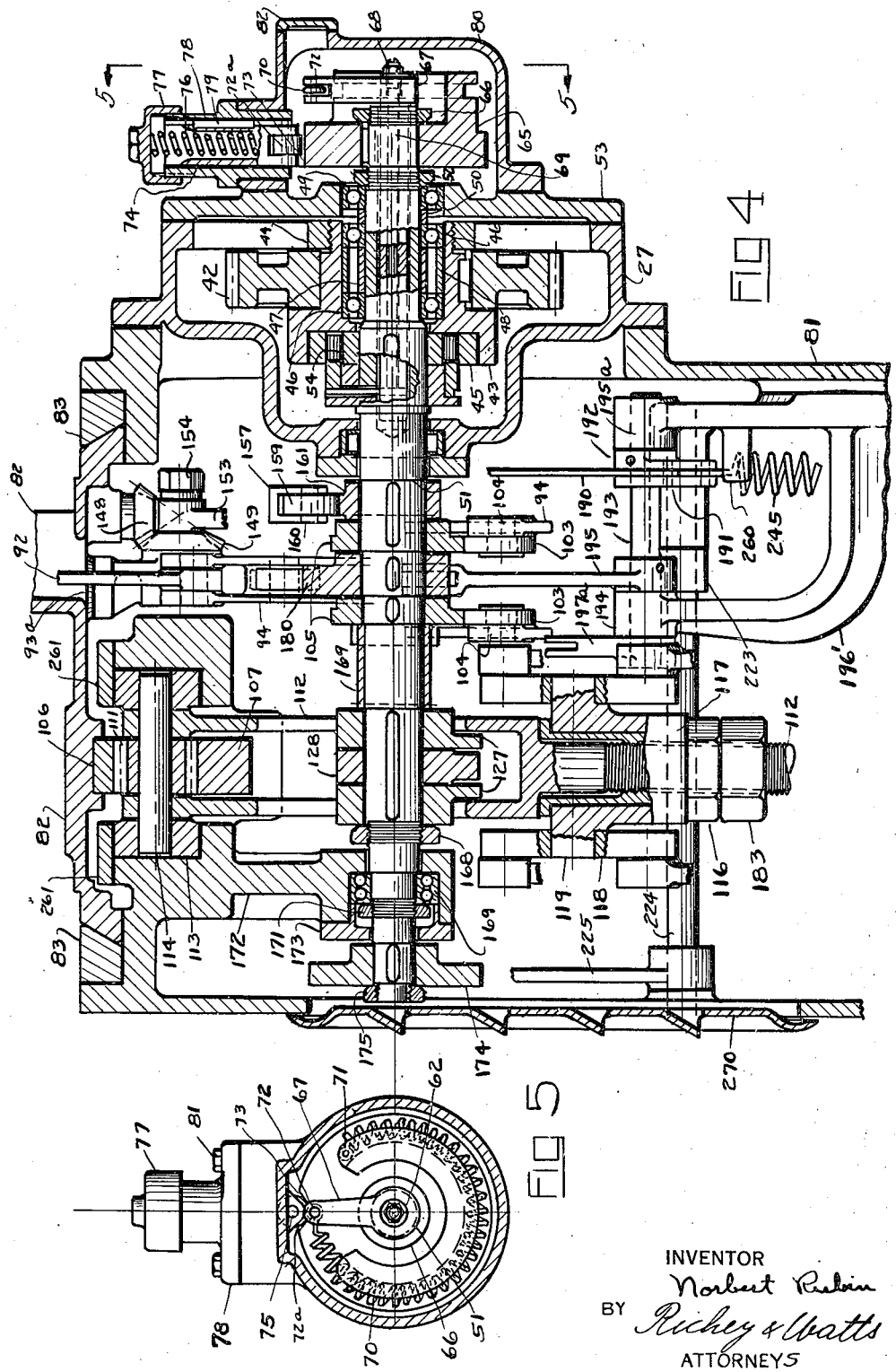
INVENTOR
Norbert Rubin
BY Richey & Watts
ATTORNEYS

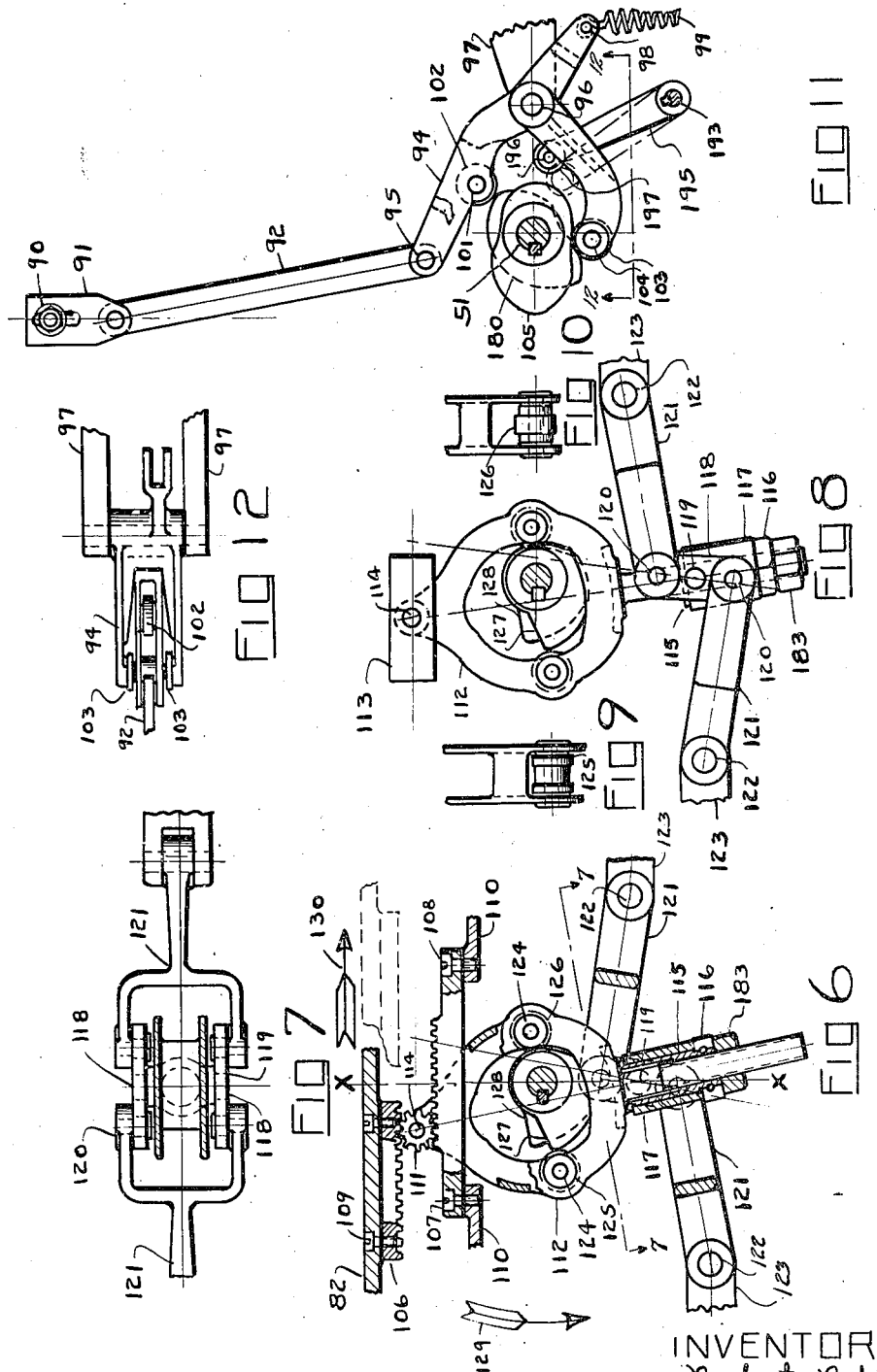

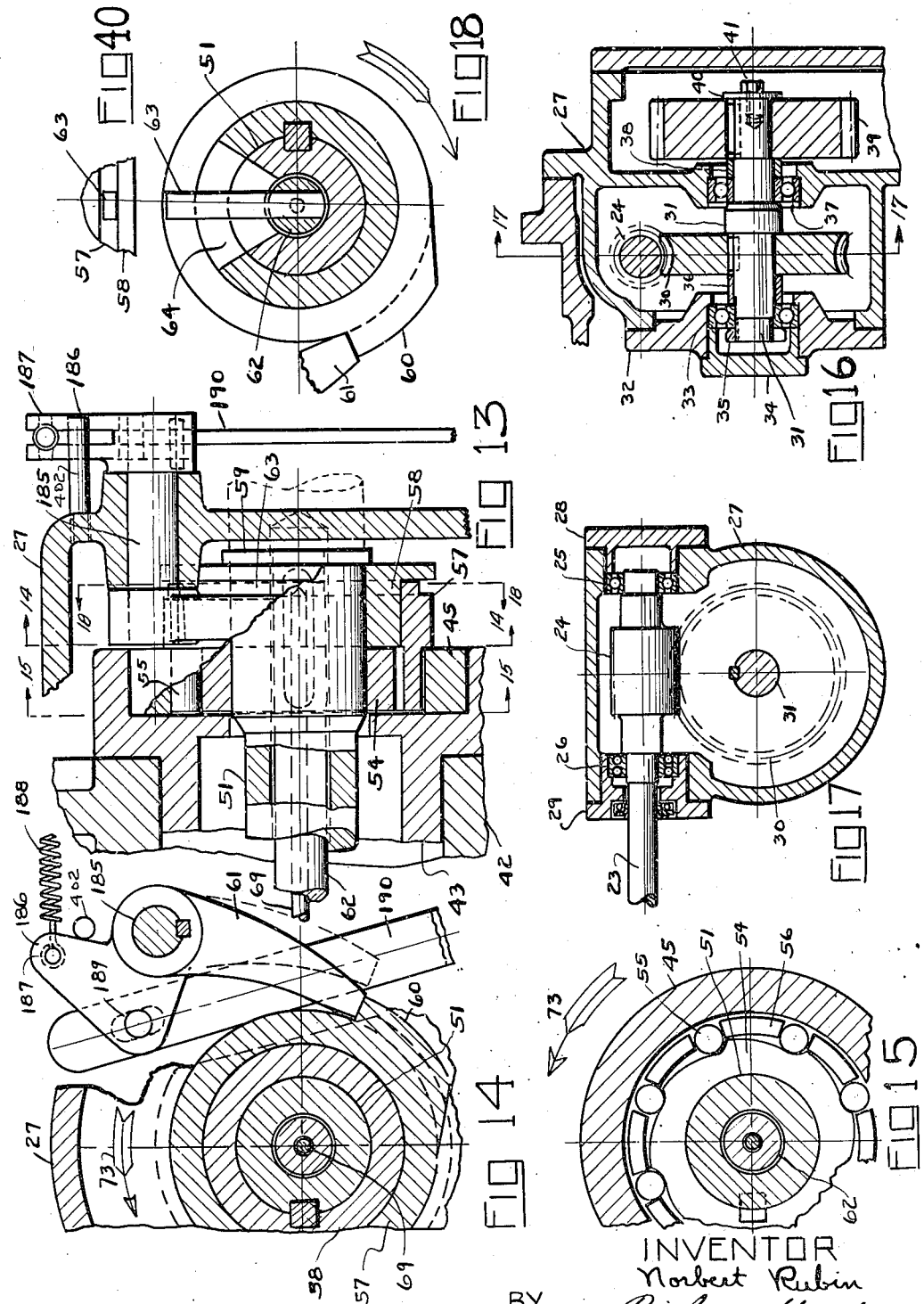

Oct. 29, 1935.  N. RUBIN  2,019,465
STOCK CUTTING MECHANISM
Filed Nov. 11, 1932  14 Sheets-Sheet 5
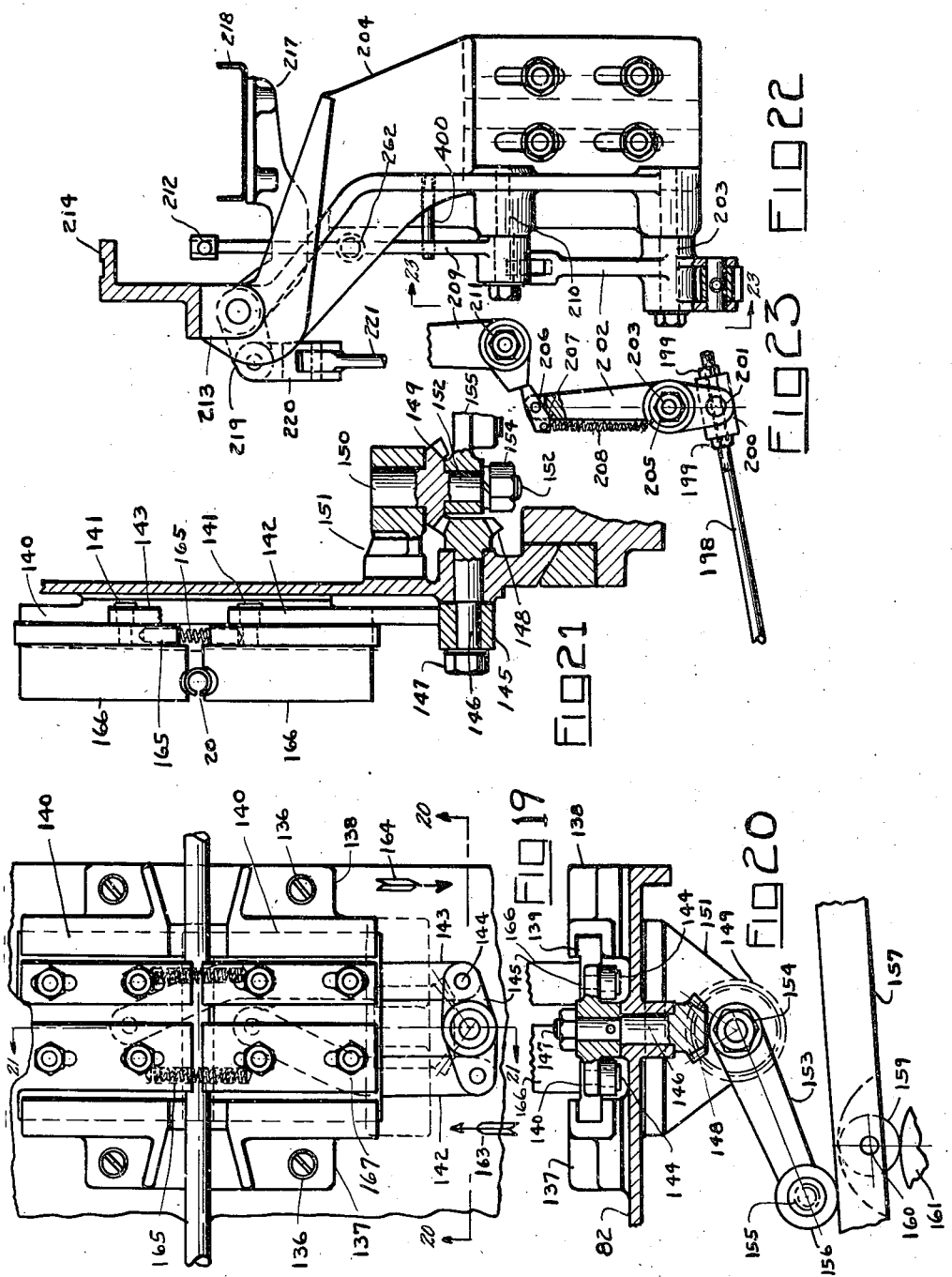
INVENTOR
Norbert Rubin
BY Richey & Watts
ATTORNEYS Oct. 29, 1935.　　　　　N. RUBIN　　　　　2,019,465
STOCK CUTTING MECHANISM
Filed Nov. 11, 1932　　　14 Sheets-Sheet 6
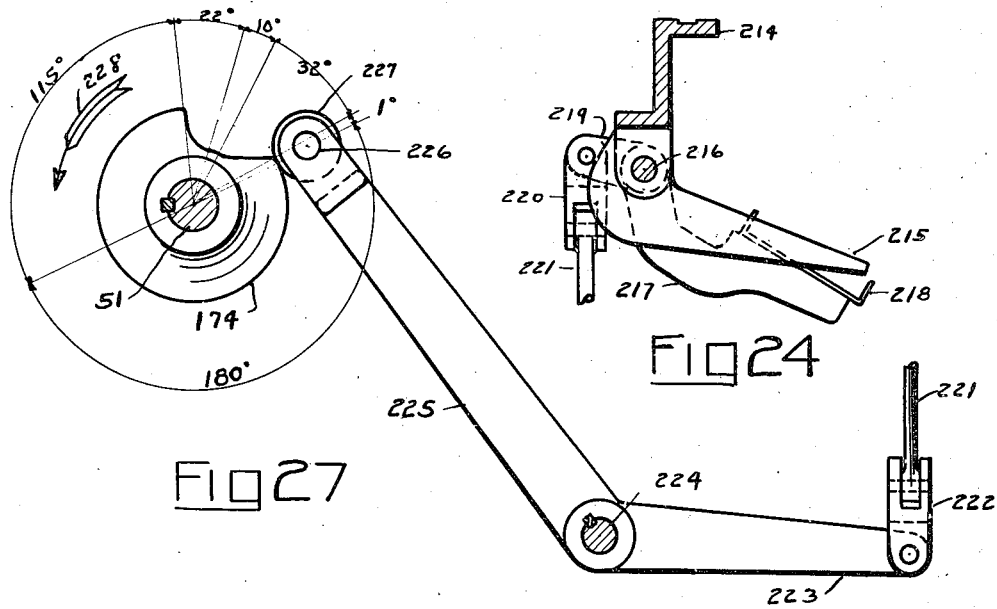
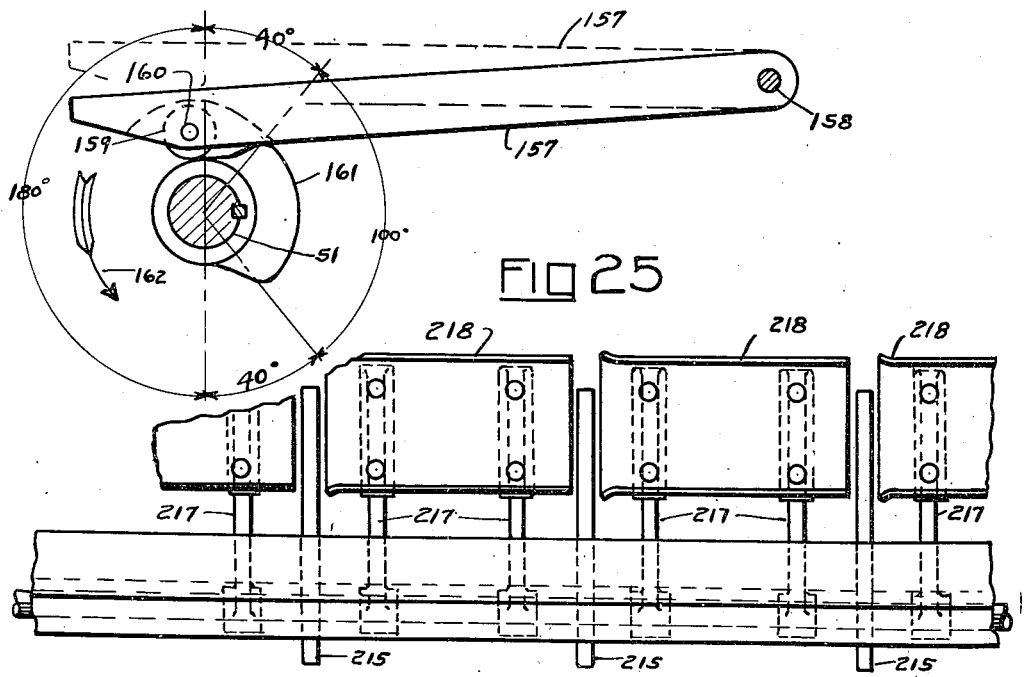
INVENTOR
Norbert Rubin
BY Richey & Watts
ATTORNEYS

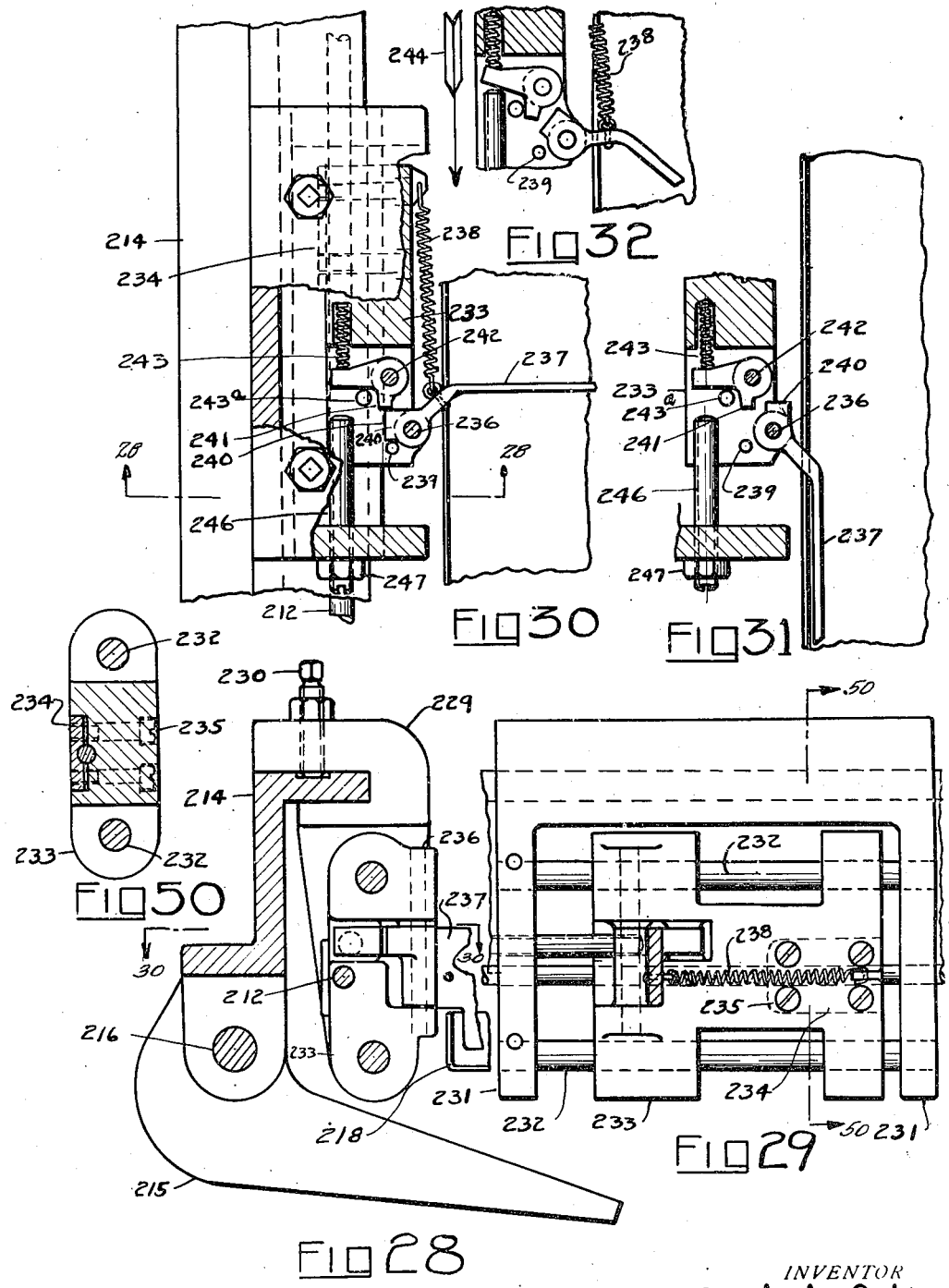

Oct. 29, 1935.  N. RUBIN  2,019,465
STOCK CUTTING MECHANISM
Filed Nov. 11, 1932   14 Sheets-Sheet 8
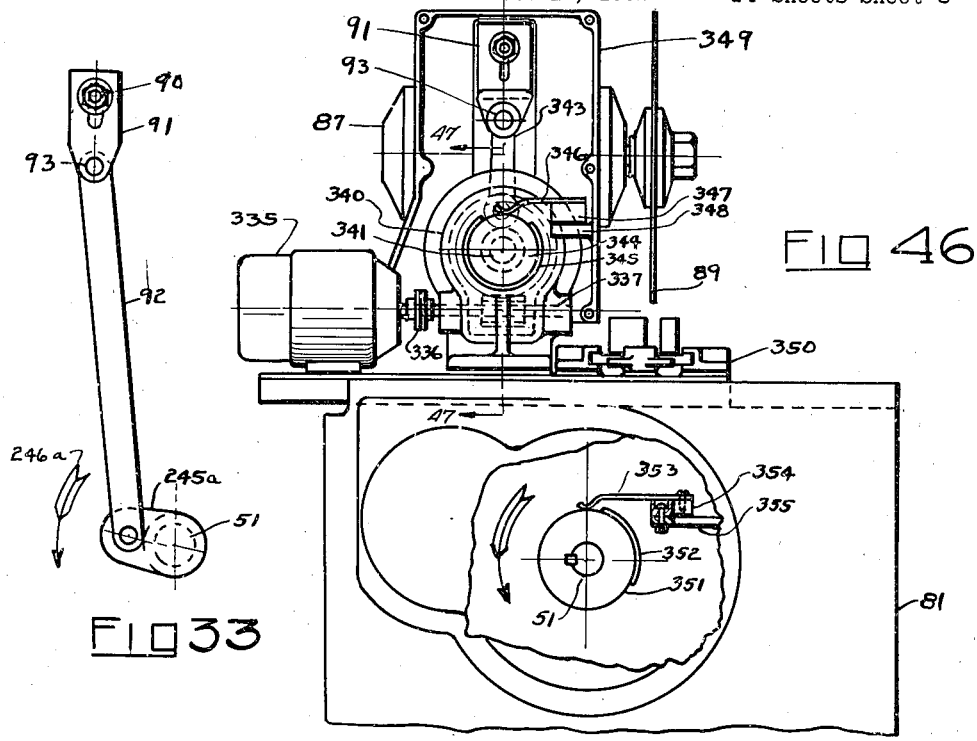
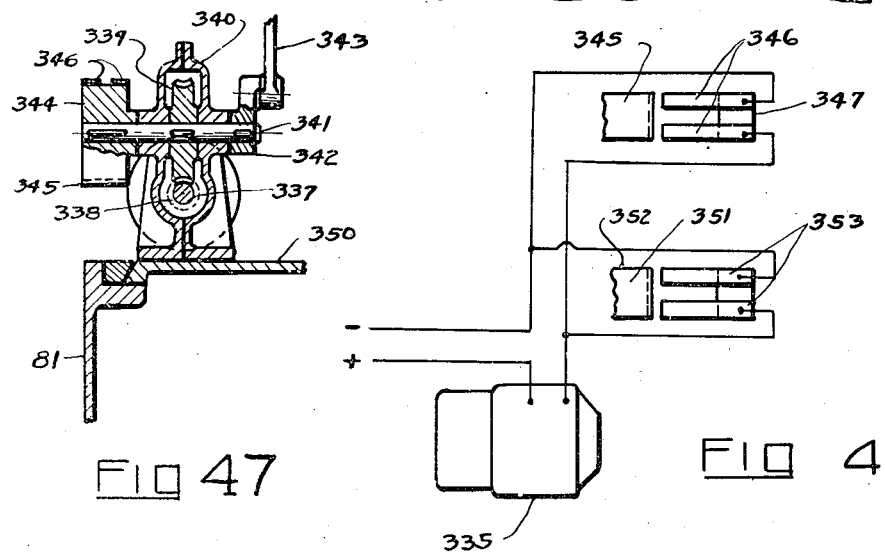
INVENTOR
Norbert Rubin
BY
Richey & Watts
ATTORNEYS

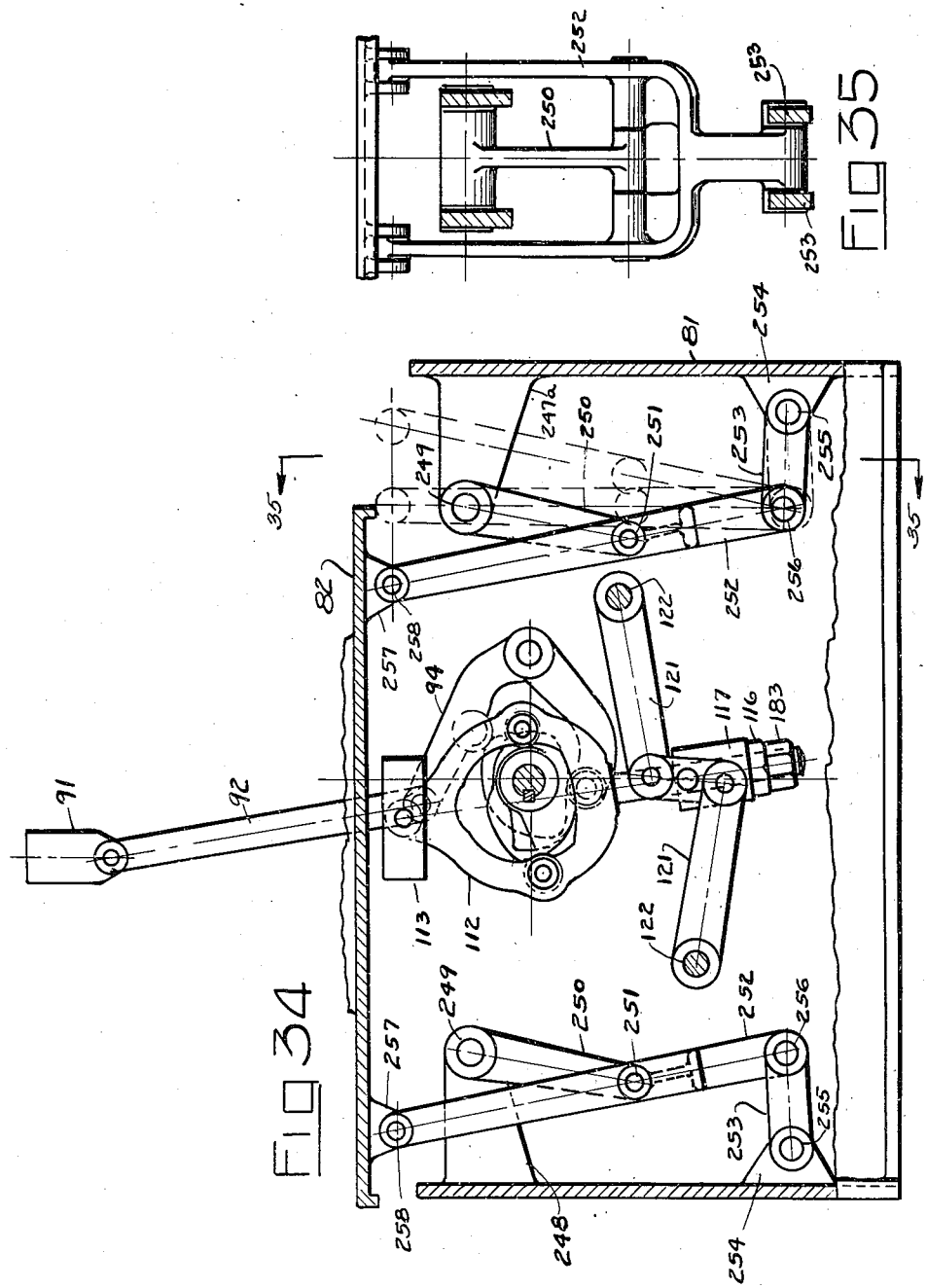

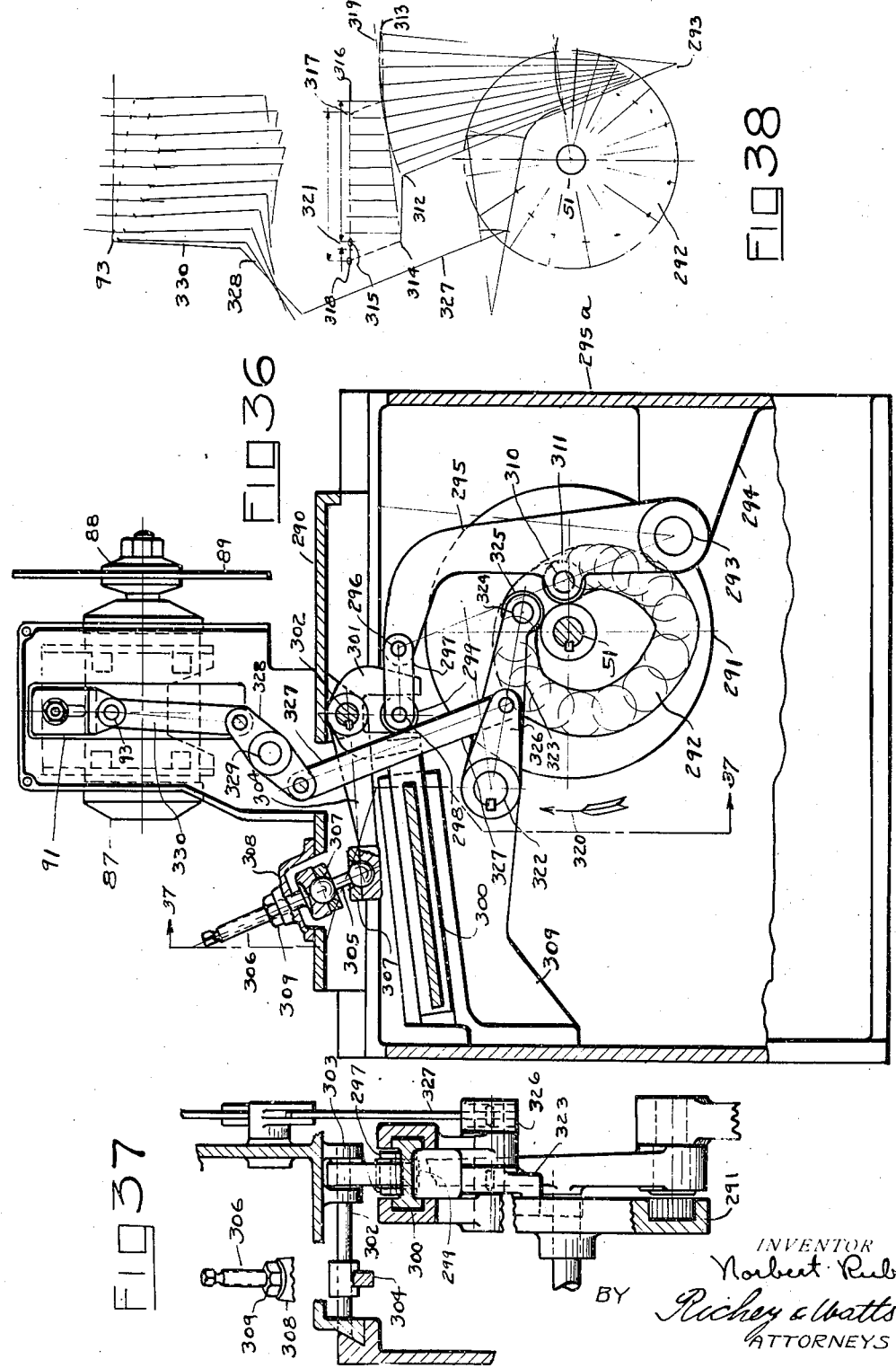

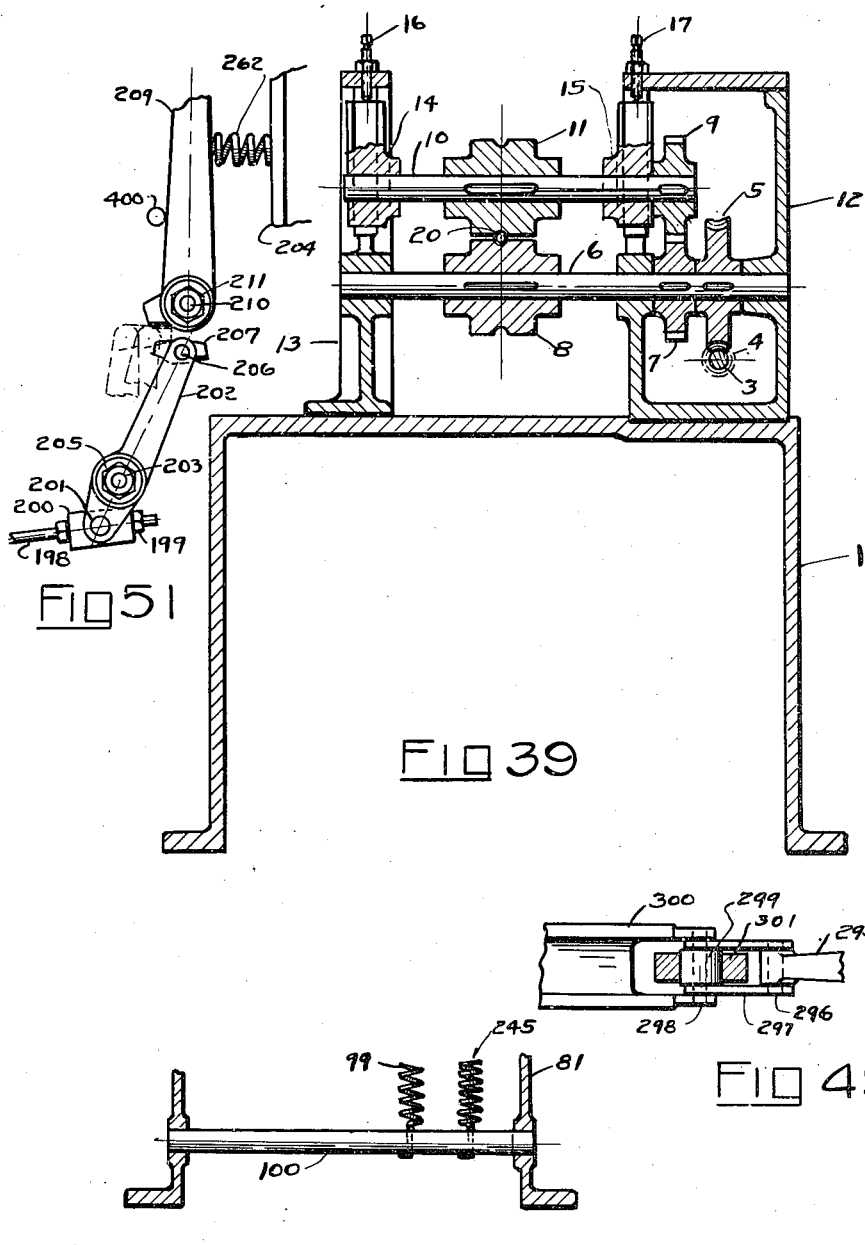

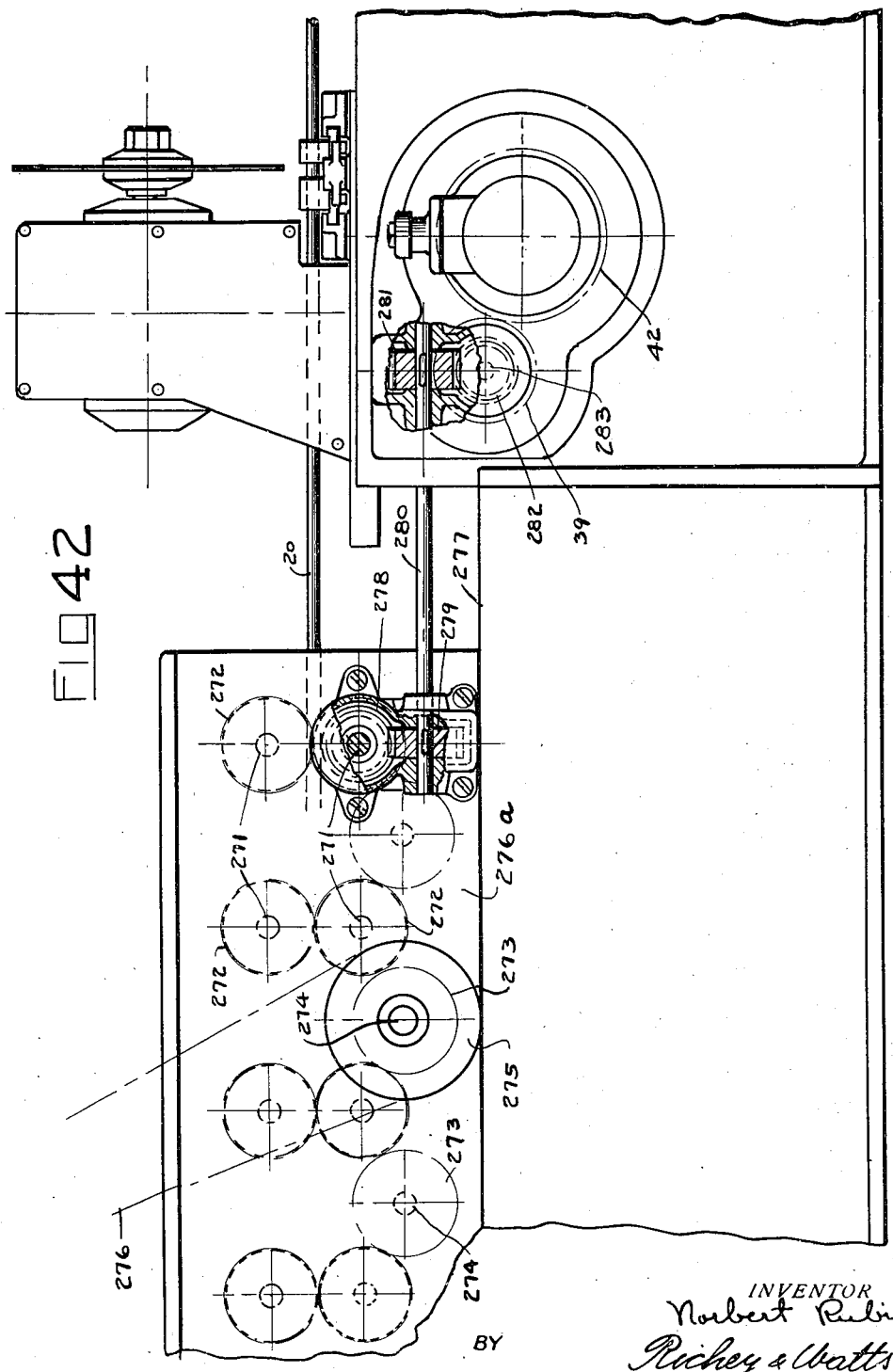

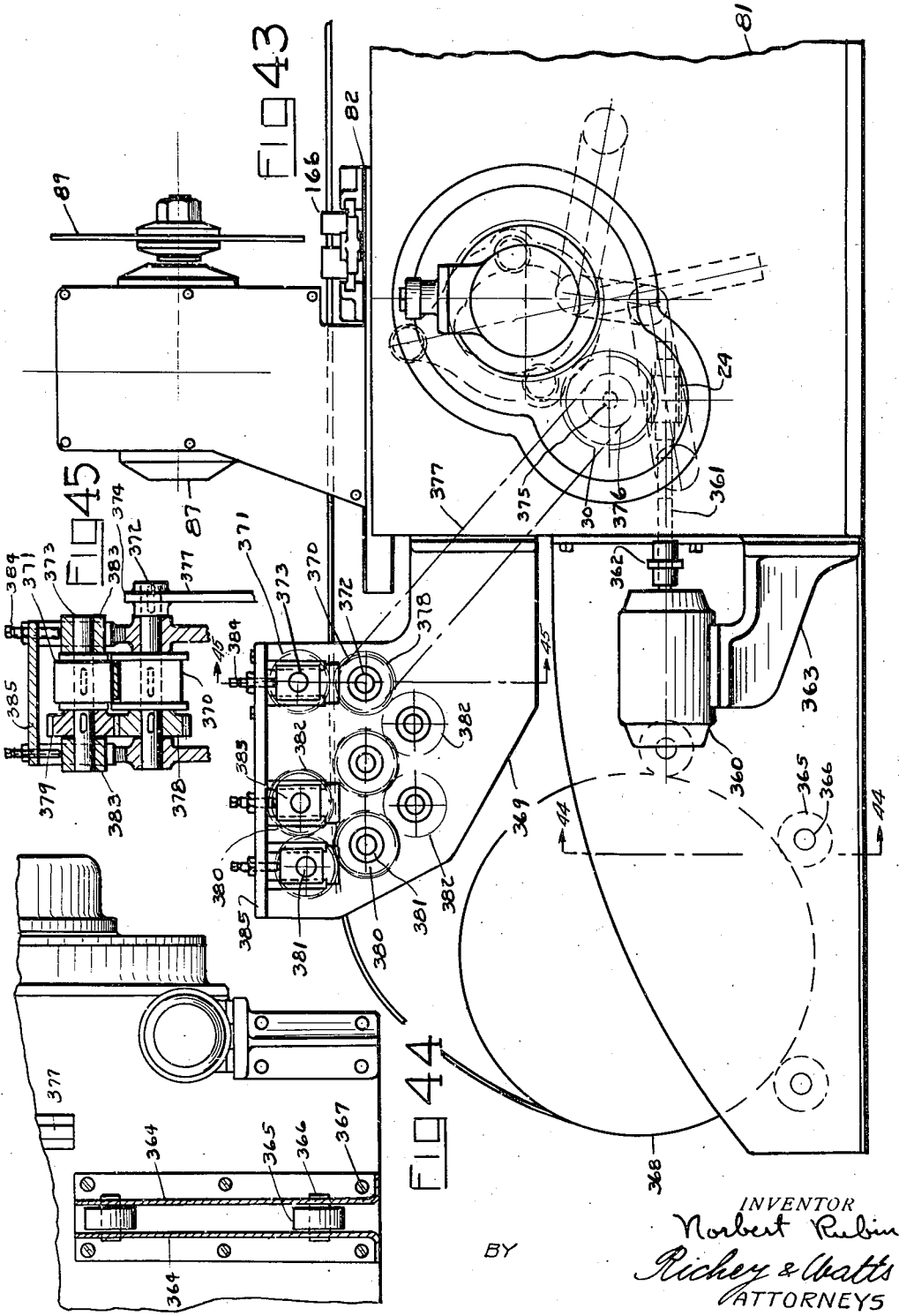

Oct. 29, 1935.  N. RUBIN  2,019,465

STOCK CUTTING MECHANISM

Filed Nov. 11, 1932  14 Sheets-Sheet 14

INVENTOR
Norbert Rubin
BY Richey & Watts
ATTORNEYS

Patented Oct. 29, 1935

2,019,465

UNITED STATES PATENT OFFICE 2,019,465

STOCK CUTTING MECHANISM

Norbert Rubin, Cleveland, Ohio, assignor to McKinney Tool & Manufacturing Company, Cleveland, Ohio, a corporation of Ohio Application November 11, 1932, Serial No. 642,230

8 Claims. (Cl. 29—69)

This invention relates to stock cutting mechanism and in particular to such devices as will cut metal bars and strips either solid or of rolled sheet section, into predetermined, variable lengths, as they are fed to the device from either a rolling machine or other feeding means.

Numerous attempts have been made to cut metal stock into predetermined lengths automatically as it is fed into the cutting device without arresting the feed of the stock. A typical device for this kind is the flying shear design used for many years, where steel bars are fed into the shear, at specified intervals a gripping mechanism attaching itself to the moving material to carry the shear and its component operating mechanism along with the stock, so that as the shear contacts with the stock incident to its cutting cycle, both the shear and the stock will be traveling at the same speed. As soon as the cut has been made, the gripping device will release contact with the stock, the stock continuing movement, while the shear returns to starting position, all ready for a second cutting operation, when again the desired length of stock shall have passed the shear. This is an old form of mechanism and familiar to all skilled in this art.

It will be evident that with this form of mechanism that only heavy bars rigid enough to carry the shear and its associated mechanism, can be cut. In my present invention, I have provided a cutting mechanism whereby the cutting means is brought to a speed exactly equal to that of the stock, without its having actual contact with the stock. In other words the stock that is to be cut travels thru my mechanism and at predetermined intervals the cutting mechanism will travel with the stock at its exact rate of speed, for that period of time that is required for the mechanism to make the cut. The cutting mechanism will then return to its starting point, ready for a second cut which occurs as soon as additional stock has passed thru the mechanism in the amount required. It will be evident that with my device, as the movement of the cutting mechanism is not dependent upon the stock for its movement, that the size and strength of the stock does not have a bearing upon the operation of the mechanism. It will be evident that very light sections can be cut, such as would be impossible with the flying shear designs above first described. This is one of the important objects of my invention.

Another form of cutting mechanism that has been built at various times is that one where the stock abuts with a fixed surface at its end when a cut is desired. The feeding rolls that are pushing the stock into the cutting mechanism will then slip during that period of time that the stock remains at rest, incident to the cutting operation. It is evident that with this form of mechanism, the feed rollers revolving on the stationary stock will mar the stock and that also the stock must be of substantial size to enable action of this nature. In my invention the cutting mechanism reciprocates with the traveling stock at the exact speed of the stock eliminating the above described marring effect.

Another important object of the invention is to provide a cutting mechanism that will attach to the delivery end of a cold roll forming machine whereby the formed section as delivered by the rolling machine will be cut to predetermined lengths, without a stopping of the rolling machine. In making formed sections from sheet metal by the use of a cold rolling machine, the speed at which the formed sections emerge at the delivery end of the rolling machine is generally slightly greater than that speed that would normally be present due to the peripheral speed of the rolls. In some cases the emerging speed will be even slightly less. It will be evident that this speed variation will be substantially constant for sections of like formation, size and sectional area, but that as the section and formation vary when rolls are changed in the rolling machine so may the emerging speed change. One condition that will cause a variance in the emerging speed is a change in the initial thickness of the stock being rolled. For instance the stock in one coil may be a few thousandths of an inch thicker than the stock of a previous coil. In such an event, this added thickness will have to be rolled out causing a greater emerging speed. Again the stock may run a little thin in which event the emerging speed will be slightly reduced. When my cutting mechanism is attached to a cold rolling machine, it is evident that it is desirable to take its drive from some driven portion of the rolling machine. I have shown in my present disclosure two forms of rolling machines, one the conventional all spur gear driven type and another the worm and gear driven type. It is immaterial which form of rolling machine is connected with my present invention. My cutting mechanism is arranged to receive a constant normal driving speed from the fixed R. P. M. of that portion of the associated rolling machine to which the hook-up is made. Also the reciprocating speed of my cutting mechanism with the moving stock is made variable so as to compensate for variable emerging speeds of the stock. I have made this speed adjustment easily accessible and controllable and this forms one of the important objects of my invention.

In the main form of my present disclosure I have shown my mechanism receiving stock from a rolling machine and cutting it into lengths. However, with my arrangement it is also possible to place the mechanism at the feed end of the rolling machine, whereby it can take raw stock from a coil or reel, and deliver it into the rolling machine in cut lengths.

I have also shown the mechanism with an individual motor drive. This form would be desirable when the cutter is not connected to an associated machine such as a rolling mill from which it can receive operative power. In many instances the mechanism will be used to take raw stock from any source and merely cut it into given lengths. This arrangement of extreme flexibility of application is an important object of the disclosure.

Another object is to provide for the operation of the cutting mechanism, a power pickup that will take the full operating power from the driving means, for operation thereof substantially instantly after the exact amount of stock has been fed thru it. It will be evident that if a variable time is present as the cutting cycles get into operation that error in the length of the cut pieces will result. I have found it desirable in most instances to use the forward end of the piece being cut as a means of tripping a trigger for starting the operation of the cutting cycle. While the operative engagement of my power pickup with its power source is for all practical purposes instantly and uniformly contacted, yet a certain amount of time may elapse between the start of a cutting cycle and the actual cut. If any variation occurs during this time in the rate at which the stock feeds into the cutting mechanism error in length of cut will result, as control of the length is broken after the trigger contacts with the end of the piece. The rate at which the stock feeds into the cutting mechanism may for instance be varied by slippage on the rolls of the rolling machine. Or if the cutter is merely receiving stock from a reel etc., the feeding pinch rolls may slip etc. With this in mind I have made provision of means that not only provide a substantially instant operative power pickup, but means that reduce to a minimum the time elapsing for a completion of the actual cut of the stock. This particular design in my mechanism, enabling a cut to close overall limits, is new to the best of my knowledge and belief in the art to which my invention appertains and this has been made the important basis for part of my appended claims. Without instant, uniform operative contact between the power pickup of the cutter, and the source supplying this power, no close tolerances could be maintained. Closely maintained overall limits of the lengths being cut is of paramount importance. Without close limits the use of any cutting mechanism is greatly restricted. Accordingly, it is another object of my invention to provide, in a mechanism for cutting advancing stock to predetermined lengths, the combination of essential attributes close tolerances in operating parts, speed of operation to reduce time lag to a minimum, flexibility of operation to accommodate variations in stock speed, adjustment to vary the predetermined length of stock cut, a range of operation adapted to stock of practically any gage, size or shape.

Heretofore, stock formed in cold rolling machines has been cut to lengths manually after leaving the machine. It is an object of my invention to provide a stock cut-off mechanism which may be attached to any of various cold rolling mills and which is adapted to cut stock of various sizes and shapes to predetermined lengths, the mechanism being flexible and adjustable to accommodate various sizes and shapes of stock. By providing a cutter mechanism operative without stopping the advance of the stock and cutter mechanism adjustable for all variable stock sections, a substantial reduction in operating costs is effected.

Another object of the invention is to provide a cutter mechanism that offers no retarding effect to the oncoming flow of stock. In rolling many sections, if the stock is made to do work after it leaves the final pass, it may cause a distortion that may ruin the shape of the section.

Another object of the invention is to provide means of confining the stock being cut adjacent to each side of the cut, the confining means being arranged to reciprocate with the cutting means at the exact stock speed during the cutting operation.

Another object is to provide in a trigger release a very sensitive mechanism so that the stock (in performing work by acting at its outer end on the trigger) can be of long slender proportions, the work effect being reduced to a minimum to reduce the column stress effect on the piece of stock.

Another result obtainable by close cutting tolerances is the saving of stock. If the lengths cut are permitted to run a little long; during a large run of lengths, the waste is considerable. This new and valuable result of close cutting limits as before referred to is dependent upon the substantially instant power engagement of my mechanism with its driving source, at the beginning of each operative cycle of the mechanism.

Another object of the invention is to provide in combination therewith, an unloader mechanism that will take either long or short pieces of stock and deposit them in a uniform pile at the side of the unloader or onto any conveyor form of removing means. Without an unloader it is evident that the pieces as cut would fall haphazardly, end down, in all directions.

Further objects and advantages of the invention are apparent from the following detailed description. While the invention in its broader aspect is capable of embodiment in various forms, a preferred embodiment thereof, and of the mechanisms forming the same, are illustrated in the accompanying drawings, in which:

Fig. 1 is an elevation of one embodiment of the mechanism with a portion of a cold rolling machine attached to the drive end thereof, with some portions removed, and sections removed.

Fig. 2 is a section taken along the line 2—2 in Fig. 1 with portions removed.

Fig. 3 is a section taken along line 3—3 in Fig. 1, with portions removed.

Fig. 4 is a section taken substantially along the line 4—4 in Fig. 1, with portions removed, and in an enlarged scale from that of Fig. 1.

Fig. 5 is a section taken along the line 5—5 in Fig. 4.

Fig. 6 is a view of a part of the driving mechanism in one position, with portions removed and in section.

Fig. 7 is a plan view of a portion of the drive shown in Fig. 6 with portions removed and in section, and taken along the line 7—7 in Fig. 6.

Fig. 8 is a similar view of that of Fig. 6 with the exception that the parts are shown in a different operative position.

Fig. 9 is a side view of the mechanism shown in Fig. 8, with portions removed.

Fig. 10 is a view of the opposite side, to that shown in Fig. 9, with portions removed.

Fig. 11 is a view of another portion of the driving mechanism, with portions removed and in section.

Fig. 12 is a section taken along the line 12—12 in Fig. 11 with portions omitted.

Fig. 13 is a section thru part of the drive containing the clutch, and taken in part along the line 4—4 in Fig. 1, the section being shown in an enlarged scale.

Fig. 14 is a section in part along line 14—14 in Fig. 13, with portions removed.

Fig. 15 is a section along line 15—15 in Fig. 13, with portions removed.

Fig. 16 is an enlarged view of a section of the drive taken along line 16—16 in Fig. 1, with portions removed.

Fig. 17 is a section taken along line 17—17 in Fig. 16, with portions removed.

Fig. 18 is a section taken along the line 18—18 in Fig. 13, with portions removed.

Fig. 19 is an enlarged plan view of the stock clamping mechanism taken along the line 19—19 in Fig. 1, with portions removed.

Fig. 20 is a section taken along the line 20—20 in Fig. 19, with sections removed.

Fig. 21 is a section taken along the line 21—21 in Fig. 19 with sections removed.

Fig. 22 is an enlarged view of the rear end of the unloader mechanism, taken along the line 22—22 in Fig. 1, with portions removed.

Fig. 23 is a side elevation of a portion of the mechanism shown in Fig. 22, and taken along the line 23—23 in Fig. 22.

Fig. 24 is another view of a portion of the mechanism shown in Fig. 22, but in a different operative position.

Fig. 25 is an enlarged view of the operating mechanism for operating the arrangement shown in Figs. 19 to 21, inclusive.

Fig. 26 is a plan view of a portion of the unloader arrangement, with portions removed.

Fig. 27 is a view of a portion of the mechanism driving the unloader, with portions in section and portions removed.

Fig. 28 is a sectional elevation of a portion of the unloader mechanism with a portion of the clutch releasing mechanism shown thereupon, and taken along the line 28—28 in Fig. 30.

Fig. 29 is a side elevation of the mechanism shown in Fig. 28 with portions removed and in section.

Fig. 30 is a partial section taken along the line 30—30 in Fig. 28 portions being cut away and others not in section.

Fig. 31 is a partial section also taken along the line 30—30 in Fig. 28 but with certain operative portions thereon in a different operative position from that shown in Fig. 30.

Fig. 32 is another partial section taken along the line 30—30 in Fig. 28 with the operative portions shown in Fig. 31 in still a different operative position.

Fig. 33 shows an optional method of making that portion of the mechanism shown by Fig. 11 with portions left off.

Fig. 34 is a partial view of certain operative portions of the mechanism shown in a different manner from that illustrated by Fig. 1, portions being left off and in section.

Fig. 35 is a partial section taken along the line 35—35 in Fig. 34, with portions left off.

Fig. 36 is a partial view of certain operative portions of the mechanism shown in still a different manner from that disclosed in Fig. 1 and Fig. 34, portions being broken away and in sections.

Fig. 37 is a partial section taken substantially along the line 37—37 in Fig. 36, portions being removed and in section.

Fig. 38 is a diagrammatic chart illustrating various operative positions of the arrangement shown in Fig. 36.

Fig. 39 is a sectional view along the line 39—39 in Fig. 1 with portions broken away and in section.

Fig. 40 is a plan view of a portion of the mechanism shown in Fig. 18.

Fig. 41 is a partial sectional view taken along line 41—41 in Fig. 1.

Fig. 42 shows an optional method of driving my mechanism from that method shown in Fig. 1.

Fig. 43 shows still another optional method of driving the mechanism.

Fig. 44 is a view along line 44—44 in Fig. 43 with portions removed and others in section.

Fig. 45 is a section along line 45—45 in Fig. 43 portions being removed.

Fig. 46 shows an optional method of driving one unit of the mechanism, portions being removed.

Fig. 47 is a section taken along line 47—47 in Fig. 46.

Fig. 48 is a wiring diagram illustrating the electrical hookup required for operation of the mechanism shown in Fig. 46.

Fig. 49 is a a plan view of a portion of the mechanism shown in Fig. 36, portions being removed and others in section.

Fig. 50 is a sectional view along line 50—50 in Fig. 29.

Fig. 51 is a view similar to that of Fig. 23 but with the mechanism in a different operative position.

Figure 52:
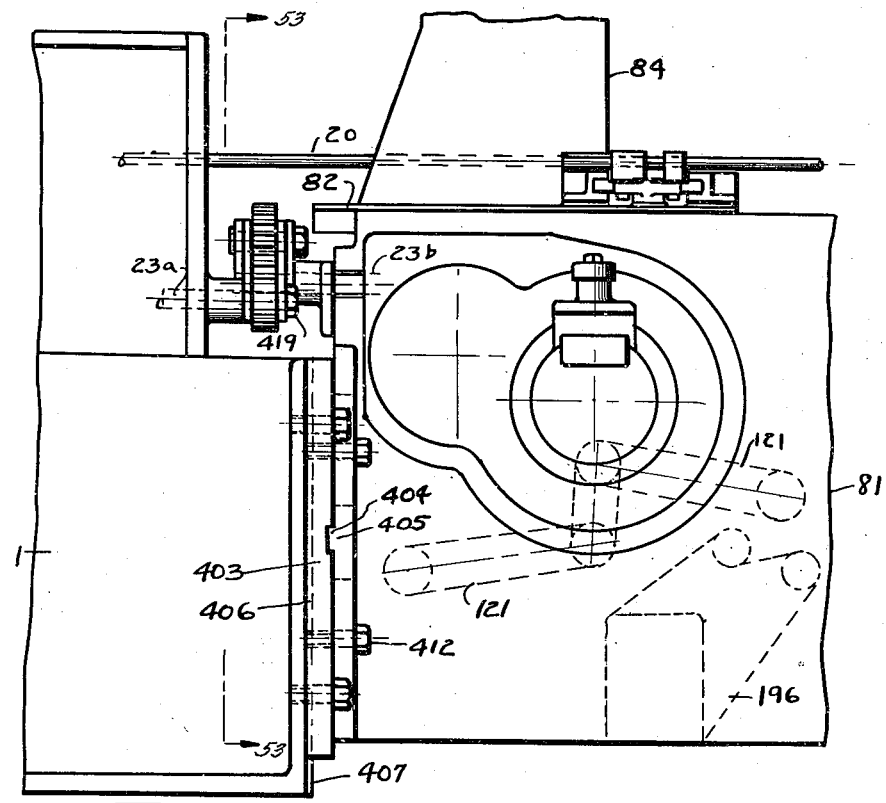
Fig. 52 is a partial view of one side of the mechanism similar to that shown in Fig. 1 but with the mounting of the unit shown adjustable.

Referring to the drawings, I, (Figs. 1 and 39) designates the bed of a conventional form rolling machine, to which I have shown attached the mechanism comprising my present invention. Mounted for rotation in bearings 2, carried by housing 12 is a worm shaft 3, a worm 4, being made a part of the shaft at a point intermediate the bearings. In driven relation to the worm 4, is a worm gear 5, the gear being fixed to a shaft 6, mounted for rotation in bearings formed in the sides of a housing 12. One end of shaft 6 extends thru one side of the housing, and has fixed thereon, at a point external the housing, a roll 8. Extending past roll 8 is a further extension of the shaft 6, which is mounted for rotation in a bearing formed in outboard housing 13. Intermediate the one wall of the housing 12, and the worm gear 5, is fixed to the shaft 6 a spur gear 7. Meshing with the gear 7 is a second gear 9, keyed to one end of a shaft 10. The opposite end of shaft 10 is mounted in a bearing block 14, slidably mounted in ways internal of the upper end of the outboard housing 13. Adjacent one side of the gear 9 is a second bearing block 15, slidably mounted in ways in the adjacent wall of housing 12. Intermediate the bearing blocks 14 and 15, and keyed to shaft 10 is a second roll 11. Arranged to bear against the bearing blocks to enable forcing the rolls 8 and 11 together, and with threaded engagement in the top of housings 12 and 13, are set screws 16 and 17. It is evident that as the screws 16 and 17 are screwed in, that the rolls will be brought together and that as they are screwed out that the rolls can be separated. It will be evident that as shaft 3 is rotated that the worm gear drive will rotate shaft 6 and roll 8 and that this rotation will then be also imparted thru the spur gear train to the shaft 10 from which the associated roll 11 will receive rotation. It is evident that as the roll 8 revolves in direction of the arrow 18 (Fig. 1) and the roll 11 in the direction of arrow 19 that stock disposed between the two rolls as indicated by 20 will be passed from the rolls in the direction of the arrow 21.

The rolls 8 and 11 and their associated driving mechanism constitute the last pass on the rolling machine. It will be evident that for each pass a similar arrangement will be required. It is also evident that the shaft 3 will therefore be extended back and at stated intervals will have driving members, not shown, for the various other passes, also not shown, receiving power from it. It is evident that shaft 3 at some point intermediate its ends will receive its driving effect from a source of motive power, such as electric motor, etc., in the usual conventional manner. The continuation of this rolling machine and its associated driving mechanism is not here shown or further described as this rolling machine does not form a part of my present invention and as it is also a mechanism familiar to all skilled in the art to which this invention appertains.

Fixed to the outer end of shaft 3 is one end of a coupling 22, to the opposite end being fixed one end of shaft 23, (Fig. 1). On the opposite end of shaft 23 is formed a worm 24, (Fig. 17). At points each side of worm 24 the shaft is mounted for rotation with bearings 25 and 26. Bearing 25 is mounted directly into a hole formed in one wall of the housing 27, and held therein by cover 28 which is fastened by screws, not shown, to housing 27. The bearing 26 is carried inside one end of a cover 29, the opposite end of this cover being fitted with a conventional oil seal. The cover 29 is mounted into housing 27, and held therein by screws, not shown. It will be evident that the purpose of mounting bearing 26 in cover 29 is so that when the cover 29 is removed from housing 27 that the worm 24 and associated parts can be removed thru the hole in the housing formed by removal of the cover.

Co-acting in driven relation to the worm 24 is a worm gear 30, (Fig. 17) it being keyed to shaft 31, at a point intermediate its ends (Fig. 16). Assembly of the worm gear 30 is made into the housing 27 thru an opening sealed by a plate 32, (Fig. 16). At the center of this plate is positioned a bearing 33, which carries for rotation one end of the shaft 31. A cover 34 is fastened to the cover 32 by screws, not shown, its purpose being retention of the bearing 33. On the shaft 31, at one side of worm gear 30, is formed a shoulder, to which the gear is clamped by means of a nut 35 screwed onto the end of the shaft, the nut clamping the gear 30 to the shoulder thru medium of bearing 33 and a spacer 36. Adjacent the opposite end of the shouldered portion the shaft is reduced in diameter to receive bearing 37, which is carried in a bored out portion of a wall internal of housing 27. Loosely mounted over shaft 31 and extending from bearing 37 is a spacer 38, which abuts at its outer end with the inner face of a spur gear 39, mounted into and keyed to this outer end of shaft 31. As a means of retention of gear 39 onto the shaft 31, I have provided a washer 40 fastened to end of shaft by screw 41. It is evident that as rotation is imparted to shaft 23, that rotation will be imparted to gear 39. The further purpose of this drive is as hereinafter more fully described.

Co-acting with gear 39 and receiving rotation therefrom is a gear 42, (Fig. 1) and mounted for driving relation therewith, upon a hub extending from one side of a clutch ring 43, (Figs. 13 and 14). A threaded portion of the ring 43 extends past gear 42, carrying a nut 44 (Fig. 4), which serves as a clamping means to retain the gear. Inside the opposite end of the clutch ring 43, is pressed a clutch member 45. Internal the clutch ring opposite the end having the member 45 are mounted bearings 46 and retainers 47 and 48 (Fig. 4). A third retainer 50, and bearing 49 are arranged adjacent to the outer bearing 46. Inside of bearings 46 and 49 and carried thereby for rotation is a cam shaft 51. A nut 52 serves to clamp bearings 46 and 49 with retainers 50, 47, and 48 against the shoulder formed on shaft 51, adjacent to the inner bearing 46. Bearing 49 is fitted for support into a cover plate 53, fastened by screws and dowels to housing 27. Continuing past the shaft shoulder adjacent inner bearing 46, is an enlarged shaft portion to which is keyed a clutch member 54. The outer periphery of member 54 contains a series of engaging steps in which lay rollers 55, (Figs. 15 and 13). On the opposite side of these rollers from that side co-acting with member 54 is the inner periphery of member 45. Extending into the space between each pair of rollers are lugs 56, these extending from and forming a part of clutch member 57, 45 mounted for rotation over member 58. Member 58 is keyed to shaft 51, and abuts at its outer end with a shoulder 59 formed on shaft 51. This outer end is enlarged in diameter for the purpose of retaining member 57 in its correct longitudinal position. Extending from its outer periphery, on its end opposite that end having projections 56, member 57 contains a shoulder 60. A knockout dog 61 contacts normally with this shoulder and is arranged to be rocked from the dotted free position shown in Fig. 14 to the normal full line engaging position. The further purpose of this dog 61 will be more fully hereinafter described. Mounted for rocking movement inside of a hole in the center of the shaft 51 is a shaft 62, its inner end being fitted with a rectangular hole into which is fitted one end of a pin 63. This pin extends up thru a slot 64, in the shaft 51 and member 58, and is fitted at its outer end into a rectangular notch in the face of member 57. It is evident that when a rocking movement is imparted to shaft 62, that the pin 63 being also rocked will move member 57, about its bearing on member 58, and that this will cause the lugs 56 to first push the rollers 55 into a wedged condition between the co-acting faces of members 54 and 45, and reversely to push them into a free or un-wedged relation. The further purpose of this movement will be more completely described hereinafter.

Keyed to shaft 51, at its end extending past bearing 49, is a member 65. The portion of the shaft to which this member is attached is reduced in diameter from that diameter onto which the nut 52 is threaded, so that a shoulder is formed onto the extreme outer end of the shaft. Extending from this end of shaft 51 is the end of shaft 62 opposite that end to which is fitted pin 63. Upon this outer end is keyed a lever 67. Also threaded into this outer end of shaft 62 is a set screw 68, operable to press against one end of a pin 69 Figs. 4 and 13, the opposite end of the pin bearing in a hole in pin 63. It is evident that as screw 68 is tightened that pin 69 will be forced against the pin 63, and that this arrangement will serve as a locking means to retain the pin 63 and to prevent it from working loose. At one point along the outer periphery of member 65 is located a groove for retention of a coil extension spring 70. One end of the spring is fastened to a pin 71 extending thru and bearing in the sides of the groove in member 65. The other end of this spring is hooked around a pin 72, bearing in the clevis end of lever 67. It is evident that if a tension is stored in the spring 70, that when the dog 61 is pulled from its shown full line position to its dotted position, (Fig. 14), that interfering contact will be broken between the end of the dog and the shoulder 60, and that the spring 70 will then be free to pull the clevised end of the lever 67 towards itself, this action rotating shaft 62 in the direction of the arrows 73, (Figs. 14 and 15), causing the lugs 56 to engage rollers 55 wedging them into contact between the associated surfaces of members 54 and 45. It is now evident that if the gear 42 is receiving rotation from its associated drive mechanism that rotation will be imparted to shaft 51. It is also now evident that if the dog 61 is again moved to its full line position, (Fig. 14) that contact will again be made with shoulder 60, and that therefore member 57 will be brought abruptly to rest, a slight continued rotation of member 54 then causing rollers 55, thru their contact with the now stationary lugs 56, to recede from driving contact to free contact between the associated surfaces of members 45 and 54. It will also be apparent that this slight continued rotation of member 54 and shaft 51, after member 57 has been brought to rest will restore the energy to spring 70 that was given out as work when the dog 61 was first moved to its dotted position, (Fig. 14) as when member 57 comes to rest, it also brings pin 63, shaft 62 and lever 67 to rest. The slight continued rotation of the shaft 51, then thru member 65 and pin 71, produces the stretching of spring 70 incident to a restoring of its initial tension. The means employed to move the dog 61, and the further purpose of rotation in shaft 51, will be more completely described hereinafter.

At the opposite side of the periphery of member 65 from that side having the spring 70, is a smooth circular surface operative for rolling contact with roller 72—a. At one point in the circumference a notch 73 is provided, and this notch is so arranged that it will contact with the roller 72—a when the member 65 is normally at rest. When rotation is imparted to member 65 the roller 72—a rides out of contact with slot 73 and at each single revolution of the member 65 it will again ride into contact with the slot 73. To carry the roller 72—a I have provided pin 74, clevised over the roller at its inner end, and fitted with a pin 75 Fig. 5, on which the roller rides. The opposite end of pin 74 is bored out to receive one end of a coil compression spring 76, the opposite end of the spring abutting on the inner surface of a cap 77, the cap being screwed onto the upper end of a retainer 78, which serves as a guide for pin 74 as it reciprocates incident to the action of the roller 72—a in moving in and out of the slot 73. To prevent a turning of pin 74 in its bearing, I have provided a key 79, fitted slidably at its one side into a key seat in the associated bearing surface of retainer 78, and carried tightly in a key seat located in the adjacent side of pin 74. It will also be evident that the compression load applied by spring 76 on pin 74 can be increased or lessened by loosening or screwing down the cap 77. Retainer 78 is mounted into the upper side of a cover 80, and held thereupon by screws 81 Fig. 5. A cover plate 82 is fastened by screws, not shown, over a hole in the face of cover 80. The purpose of this hole is to enable inspection of roller 72—a. Cover 80 is fastened by screws to cover 53, the entire assembly of housing 27, cover 53, and cover 80 being arranged for retention of gear lubricant around the mechanism internal thereof. The further purpose of member 65, associated roller 72—a and the above described action will be more completely described hereinafter.

Carrying the housing 27, and associated parts, is a bed 81 (Figs. 1 and 4). At the upper side thereof is mounted for reciprocal movement a table 82, it being supported by guide ways formed in the bed at each side thereof. Adjustable gibs 83 are fastened to the bed by bolts, not shown, in the conventional manner, the gibs serving as guides for the table incident to its reciprocatory movement. Extending upward from the table 82, and forming a part thereof, is a motor slide support 84, this being arranged with slide ways for retention in reciprocal relation thereto, of a motor slide 85 (Figs. 1 and 3). Adjustment of the slide 85 in its ways is made thru a gib 86, held to the support 84, and adjusted in relation to the slide in the conventional manner, by screws, not shown.

Fastened to the slide, and carried thereby is an electric motor 87. Extending from the forward end of the motor is the motor shaft, and keyed thereto, are washers 88, between which is keyed a circular saw 89. At the side of the slide 85, opposite the motor, are arranged a series of serrations. Co-acting with these, and held thereto by a screw 90, is the serrated face of a member 91. A screw 90, is threaded into slide 85, passing thru a slot in member 91, so as to enable the slide to be located at varying positions on member 91. The lower end of member 91 terminates in a clevis, internal of which is fitted the upper end of a link 92. A pin 93 extends thru the walls of the clevis and that associated end of link 92, the link being arranged for rocking movement about the pin. This link extends downward thru a hole 93—a in the table 82, the lower end of which terminates in a pin connection 95, with the outer end of a three armed lever 94, (Figs. 4 and 11). Lever 94 is pivoted for rocking movement about a pin 96, carried in a pair of lugs 97, extending from the associated wall of bed 81 (Figs. 1, 11, and 12). Extending rearward from pin 96 is a second arm of the lever 94, this terminating in a clevis thru which passes a pin 98, carrying one end of a coil extension spring 99. The opposite end of this spring is fastened to a bar 100, which passes thru internal of the walls of the bed 81, receiving support in holes bored in opposite sides of the bed, (Fig. 43). It is now evident that the weight of motor 87, slide 85, link 92 etc., will be counterbalanced by the tension that may be stored in spring 99. Intermediate the pins 95 and 96 is a clevised portion of lever 94, thru the walls of which pass a pin 101 on which is mounted for rotation, a roller 102. Co-acting with the face of this roller, is the face of a cam 100, keyed to shaft 51. This cam when receiving rotation is operable to move the arm of lever 94, containing roller 102 upward, raising the slide 85. A third arm of lever 94 extends, bifurcated, downward out from the pivot point, terminating at its outer end in a pair of rollers 103, mounted for rotation on pins 104, pressed at one end into lever 94. These rolls co-act operatively with the faces of a pair of cams 105, (Figs. 4 and 11), keyed to shaft 51. These cams have similar faces and when receiving rotation from shaft 51, are operable to move the lever 94 downward, this action lowering the slide 85 with its associated motor. The further purpose of this movement applied to lever 94, will be more completely described hereinafter.

Fastened by screws, 109, to the under side of the table 82, is a rack 106, (Figs. 1, 4, and 6). Directly beneath this and fastened to lugs 110, extending from the associated walls of bed 1, by screws 108, is a second rack 107. Interposed in toothed relation between the two inner faces of the racks is a pinion 111. Clevised around the pinion is the upper end of a lever 112. Clevised around this lever end is a slide 113. This slide bears for reciprocal movement in ways formed at the upper side of the bed 81 (Fig. 4) being retained in these ways by plates 261 fastened by screws, not shown. This slide serves to support the pinion 111 in correct toothed rolling engagement between its associated racks 106 and 107, the slide also supporting the weight of lever 112.

A pin 114 passes thru the walls of slide 113, thru the end of lever 112, and thru pinion 111, the pinion being arranged for rotation and the lever 112 for rocking movement thereupon. The lower end of lever 112 terminates in a threaded portion over which is screwed a sleeve 115, (Fig. 6). The upper end of the sleeve is flanged, the lower end terminating in a shouldered portion to which is pinned a nut 116. Surrounding the sleeve between nut 116, and the flanged upper end, is a bearing block 117 having at opposite sides thereof, a trunnion extension 119. To each trunnion for rocking movement thereupon is mounted a link 118. Extending each side of the trunnion, an equal distance, the link terminates in pinned connections 120, with the inner ends of levers 121, each lever being pivoted for rocking movement on pins 122, carried by lugs 123. This linkage consisting of links 118 and levers 121 constitutes the well known straight line motion. It is evident now that if the pinion 111 is moved in a straight line, that the trunnions 119 will move along the perpendicular line XX, (Fig. 6), the distance between trunnion 119 and pinion 111 remaining constant. Intermediate its ends lever 112 is bifurcated, the two separated members terminating at the top and the bottom of the lever in single portions. Each bifurcated portion carries a pin 124, mounted in adjacent walls of the lever, and operable to carry rollers 125 and 126 for rolling motion thereupon. Roller 125 has the two outer edges of its face of one diameter, the center portion being formed a reduced diameter, (Fig. 9). These two outer edges co-act with the faces of a pair of cams 127 keyed to shaft 51, (Figs. 4, 6, and 8). The other roller 126 has an enlarged diameter at its center portion which co-acts with the face of cam 128, also keyed to shaft 51. The arrangement of these cams is such that when shaft 51 is rotated in the direction of the arrow 129, (Fig. 6), that the upper end of lever 112, with its associated pinion 111, and slide 113 will move in the direction of the arrow 130, (Fig. 6). The rack 106 above the pinion being also in toothed engagement will be moved in the direction of the arrow 130 and at twice the speed of the pinion. The cams 127 and 128 are preferably designed so as to impart a uniform reciprocal motion to table 82. Also the cams are arranged to give a gradual acceleration and similar deceleration at either end of its stroke.

Fastened to the table 82 by screws 136 are guides 137 and 138, (Figs. 19 and 20), each guide containing a slideway 139 carrying for reciprocal movement therein a pair of plates 140. A pin 141 is pressed into each plate, one end of the pin extending outward, its outer end forming a bearing upon which is mounted for rocking movement one end of each of a pair of links 142 and 143. The outer end of the pin being shouldered for retention of the ends of the links. The opposite end of each link is arranged for rocking movement on pins 144 pressed into lever arms extending from the hub of a lever 145. This lever midway the pins 144 is keyed to the shouldered upper end of a shaft 146, being retained in position thereupon by a lock nut 147. Extending downward, the shaft 146 is journaled in a bearing formed in the table 82. The opposite end of this shaft terminates in a bevel gear 148, having toothed engagement with a second bevel gear 149. Extending back from gear 149 and formed therewith is a shaft 150 journaled in a bearing bracket 151, held by screws, not shown, to the under side of table 82. Extending from gear 149 at its side opposite shaft 150 is a second shaft 152, having keyed thereupon one end of a lever 153, being retained by a lock nut 154. Into the opposite end of the lever 153 is pressed a pin 155, a projecting end of the pin having mounted thereupon for rotation a roller 156, a head formed on the outer end of the pin serving for retention of the roller. Co-acting with the face of the roller is a cam bar 157 (Figs. 20, 4, and 25), pivoted at its one end for rocking movement about a pin 158, (Figs. 1 and 25), fixed into a boss extending from one side wall of the bed 81. Near the opposite end of bar 157 is formed a clevis portion in which is guided for rotation a roller 159, the roller being carried on a pin 160, extending for bearing support into the adjacent walls of the clevis. Co-acting with the face of roller 159 is the face of a cam 161, keyed to and receiving driving movement from shaft 51. It is evident that as the cam 161 is rotated in the direction of arrow 162, (Fig. 25) that the bar 157 will be raised first from its full line position in Fig. 25 to its dotted line position. Then for 100 degrees rotation of the shaft 51, it will dwell in the dotted position, falling again to the full line position in the succeeding 40 degrees rotation of the shaft, and dwelling in the full line position thru the next 180 degree travel, each cycle of cam operation consuming 360 degrees rotation of the shaft 51. As the bar 157 is raised, the end of lever 153 connected to roller 156 will also be raised and thru the bevel gears 148 and 149, shaft 146 will be rotated, thus rocking the lever 145 so that link 142 is moved in the direction of arrow 163, and link 143 in the direction of arrow 164. These link travels will move plates 140 towards each other. Inside of holes arranged in the inner ends of each plate 140 are coil compression springs 165, which serve to keep plates 140 separated from each other, one end of each spring abutting against one plate at the bottom of its hole, the opposite end of each spring abutting against the other plate at the bottom of its hole. It is evident that as the cam bar 157 raises to its dotted position, (Fig. 25) that the resultant movement imparted to plates 140 will compress the spring 165, and that when the cam bar drops to its full line position that the plates 140 will again be forced apart by the action of the spring as they retain roller 156 in contact with the face of the cam bar. The bar 157 is provided so that predetermined cam movement of cam 161 is imparted to plates 140 at all operative longitudinal positions of table 82. Fastened to the top of plates 140 by studs and nut 167 are vise jaws 166. The studs pass thru elongated holes in the jaws so that when the nuts are loosened, the jaws may be moved in or out as desired. These jaws are for confining the stock 20 at predetermined intervals during the cutting operation, as more completely described hereinafter.

Shaft 51 is driven at its one end by gear 42 and transfers rotation to cams 161, 180, 105, 127, 128, and 174. To retain these cams in correct longitudinal position I have provided a nut 168 threaded to shaft 51, adjacent to outer cam 127. It is evident that tightening the nut will hold all cams and the spacer 169 in position shown, clamping effect for inner cam 127 being obtained against an adjacent shoulder formed on the shaft 51, with the cams 105, 180 and 161 bearing against associated shoulders on shaft. Extending past the nut 168, the shaft 51 passes thru a ball bearing 169, clamped against a shoulder on the shaft by a nut 171, the bearing being positioned in a lug 172 extending downward from the upper wall of the bed 81, and retained therein by a cap 173 (Fig. 4), which is fastened by screws, not shown, to lug 172.

Extending thru the cap 173 (Fig. 4) the shaft has another shouldered step to which is keyed a cam 174, the cam being retained on shaft by a nut 175, threaded onto the end of the shaft. It is evident that nuts 175, 168, 44, 52, and 66 can all be provided with the conventional locking washers supplied in ball bearing construction but as this washer forms no part of my invention it is here only suggested and not shown. The purpose of cam 174 will be more fully described hereinafter.

In order to vary the amount of stroke imparted to table 82 by cams 127 and 128 I have provided an adjustment that will lower the trunnion 119 downward from its position in Fig. 6 to its position in Fig. 8. It is apparent that this increases the fulcrum distance and as the imparting motion of the cams 127 and 128 remains unchanged, the distance pinion 111 travels is less. In the same proportionate amount as the pinion travel is thus reduced, so is the travel of the table 82 reduced, although the R. P. M. of shaft 51 remains unchanged. This results in a certain feet per minute travel of table 82, at the setting shown in Fig. 6 and a lesser feet per minute with the setting shown in Fig. 8. The further purpose of this adjustment is more fully described hereinafter.

The operation of the mechanism is as follows.

While the cutting mechanism is operable to be fed by stock from any feeding means, yet I have shown it in the present instance as being fed by a cold roll forming machine. The roll forming machine, Fig. 1, has a plurality of stands, each constituting a pass, thru which the stock travels, it being formed and reformed at each pass, reaching its final shape at the last pass, the stand of which I have shown as housing 12, rolls 8 and 11, and their associated members. To take off power to drive my cutting mechanism I have attached my shaft 23 (Fig. 1) to the power shaft 3 of the rolling machine. In Fig. 42, I have shown a different form of rolling mill. Here spindles 271 carry the rolls, each spindle being driven by a gear 272, variation in the center distance between rolls, for varying stock thickness being had by pulling the gears slightly out of mesh one with the other in the usual conventional manner shown in Fig. 41. Meshing with each lower gear 272 and simultaneously with each of a pair of gears 272 are gears 273, carried by shafts 274. One shaft 274 carries a pulley 275 driven by a belt 276 from any source of power. A housing 276—a supported on a bed 277 carries in suitable manner, bearings for all the above shafts. Detail construction of this form of rolling mill is not here further shown or otherwise described as this spur gear driven rolling mill is one of the oldest forms existing in this art, and in itself forms no part of my invention. To take off power to drive my cutting machine from this form of mill I have shown a spiral gear 278, fixed to the last spindle 271, this gear meshing with another spiral gear 279 fixed to a shaft 280. At the opposite end of this shaft is fixed a spiral gear 281, meshing with a gear 282 fixed to shaft 283 corresponding to shaft 31 in Figs. 16 and 17. Suitable bearings are provided for shaft 280 in the housings retaining gears 278, 279, 281 and 282. It is evident that when belt 276 transmits rotation to pulley 275 that this resultant rotation thru gears 273, and 272, to gears 278, 279, etc. will drive shaft 283. Onto shaft 283 is fixed the gear 39 and further operation of this mechanism is as described for Fig. 1.

Any such mill as shown in Fig. 1 or the one in Fig. 44 can be used, my only purpose for showing both is to show first a built in drive for my cutting mechanism (Fig. 1) and second a cutter where the drive is taken from one of the spindles of the rolling machine (Fig. 44).

It is evident that as the rolling machine feeds the stock 20 from its rolls, that the resultant rotation of shaft 3 will transmit power thru shaft 33 into gear 42. However, as clutch dog 61 is still in its full line position, Fig. 14, gear 42 and its associated supporting member 43, will rotate upon bearings 46, the shaft 51 being at rest. Stock 20 from the rolling machine now passes over table 82, between the opened vise jaws 166. In the present instance the stock is shown as a simple form of tubular section, rolling of which is common practice. For this tubular section a vise jaw 166 as shown would be a desirable form. For other sections other jaws may be correspondingly shaped. With this in mind I have shown the jaws easily removable so that as rolls are changed in the rolling machine to make different sections, varying sets of jaws to suit the different sections can be attached to the plates 140. Assume the stock as now traveling over the table and between the opened vise jaws. A predetermined length has passed by, and it is now desired to operate the cut-off. To accomplish this I have provided means that will be more fully described hereinafter, to pull clutch dog 61, Fig. 14, from its full line position to its dotted position where it remains for that interval of time necessary to permit spring 70 to snap rollers 55 into contact driving relation between the co-acting surfaces of members 54 and 45. As gear 42 and members 43 and 45 rotate continuously it will be seen that this power will now be picked up thru rollers 55, and that the shaft 51 will start revolving. As rotation is imparted to the shaft, first a forward travel will be imparted to the table 82, and this accelerated to where its speed equals that of the stock. At 40° rotation of the shaft, the cam 161 will cause the vise jaws 166 to grip the stock, (Fig. 25). The table now continues to move with the stock, the saw and its associated motor starting to descend, the saw reaching its down position at approximately 120° rotation of shaft 51. At 140° rotation of the shaft, cam 161 causes, thru its associated members, the grip of the vise jaws on the stock to be released. Continued rotation of shaft 51 now raises the saw until at 180° rotation of the shaft the saw is substantially at its high position. The table 82 has now reached the limit of its forward travel and continued shaft rotation causes its return, completion of the cycle being reached at 360° travel of the shaft. Prior to the completion of the rotation of shaft 51, the dog 61 is permitted to re-engage lug 60, and by bringing member 57 to rest the rollers 55 are revolved to their non-driving position, Fig. 15, between members 45 and 54. Shaft 51 now comes to rest while gear 42, members 43 and 45 continue to revolve again freely on bearings 46. To exactly synchronize the feet per minute travel of the table 82 to that feet per minute travel of the stock, the nut 183 is loosened, and nut 116 adjusted either up or down, as the case may be until the correct speed of table 82 is obtained. If adjustment of nut 116 is not sufficient to bring table to its desired speed, additional change can be made by removing gears 39 and 42, replacing these gears with new ones having different numbers of teeth, keeping in mind that the sum of the teeth in the new gear combination must equal the sum of the teeth in the gearing removed. This to maintain the center distance.

To provide for accessibility in making adjustment of nut 116, I have shown a louvre door 270 (Fig. 4). This opens on hinges of the conventional type, not shown, at one side thereof, and is held closed by a conventional common latch at its opposite end. These latches and hinges are not here shown or otherwise described.

As the table 82 comes to a rest at the completion of its cutting operation, roller 72—a drops into notch 73. However, just prior to the completion of rotation of shaft 51, roller 72—a starts to ride down into the notch, and the combination of the inclined wall of the notch (Fig. 5) with the pressure of spring 76 will cause the shaft 51 to receive a slight driving power in addition to that imparted from member 45. This will cause reduction of the pressure of contact of rollers 55 with their respective contacted surfaces. In effect if the pressure of spring 76 were great enough the member 54 would rotate faster in the direction of arrow 73, than the speed of rotation of member 45, during the time roller 72—a was traveling down the incline of the notch 73. This, it is evident would tend to bring roller 55 out of driving engagement just prior to and during the operation of member 57 by dog 61, thus reducing wear on the dog 61. The dropping of the roller into the notch also guarantees that shaft 51 starts and stops its operative cycles at exactly the same points in each revolution.

The clutch dog 61 is keyed to a shaft 185 (Figs. 13-14) the shaft passing for rocking movement thru a bearing formed in the adjacent wall of housing 27, the opposite end of the shaft having keyed thereupon a lever 186. Extending from hub of the lever 186 is a clevis arm having two holes, the upper having a pin 187 to which is fastened one end of a coil extension spring 188, the opposite end of the spring being fastened in any suitable manner, not here shown, to any near adjoining wall of the bed 81. It is evident that the spring will tend to retain dog 61 in the full line position and against stop pin 402 (Fig. 14) being mounted fixed in housing 27. At those times when the dog is moved to its dotted position the spring will be stretched. In the lower portion of the clevis of lever 186 is a pin 189, passing thru and bearing tightly, one end in each wall of the clevis. Mounted for reciprocation over this pin is the upper end of a link 190, this link having a slot thru which the pin 189 passes, this being arranged for sliding movement between the clevis walls of the lever. Extending downward the link 190 terminates at its lower end in pinned connection, thru pin 191, with the clevis end of a lever 192 (Figs. 1 and 4). Lever 192 is pinned to a shaft 193, mounted for rocking movement in bearings 194 and 195—a of a bracket 196', extending from, and fastened by screws, not shown, to a wall of the bed 81 (Fig. 4). To the outer lower end of lever 192 (Fig. 1) is connected one end of a coil tension spring 245, the other end of the spring being hooked into a hole in bar 100. This spring operates to pull link 190 downward for purposes hereinafter described and I have limited the resultant downward travel of lever 192 by providing a stop pin 260 (Fig. 1) extending outward from the associated wall of bracket 196' into interfering relation to an extended portion of the lever 192. At one side of bearing 194, hub of a lever 195 is pinned to shaft 193 (Fig. 4). Mounted for rotation on a pin 196, (Fig. 11) extending thru the clevised end of the lever 195 is a roller 197 co-acting, at predetermined intervals, with the face of cam 180 (Fig. 11). The purpose of this lever is as hereinafter described. Pinned to shaft 193 at the opposite side of bearing 194 is the hub of a lever 197—a. This lever extending upward terminates at its upper end in a clevis into which is pinned for rocking movement one end of a rod 198 (Figs. 1, 22, and 23). Extending outward thru a hole in the adjacent wall of bed 81, rod 198 terminates in a threaded portion to which is screwed a pair of nuts 199. Over the threaded end of the rod, and clamped thereupon by and between the nuts 199 is a sleeve 200 (Fig. 23). Passing thru the sleeve and having a hole central thereof, for the passing thru of rod 198, is a pin 201, this pin being journaled for rocking movement in the sides of a clevis extending downward from the center of a lever 202. Lever 202 is journaled for rocking movement about a pin 203, the pin having one end pressed into a boss extending from the side of bracket 204, its opposite end having a threaded engagement with a nut 205, arranged for retention of the lever. Pivoted for rocking movement about a pin 206 and clevised in an upwardly extending arm of lever 202 is a block 207, a rear extension of the block containing a hole to which is fastened one end of a coil extension spring 208. The opposite end of this spring is fastened into the hub of the lever 202. The end of block 207 opposite the end having spring 208 is angled off to form a sliding contact against a projecting portion of a lever 209. Lever 209 is journaled for rocking movement about a pin 210, the pin having one end pressed into a boss extending from the bracket 204, its opposite end having threaded engagement with a nut 211 arranged for retention of the lever (Figs. 22-23). Pivoted for rocking movement about the end of an upwardly extending portion of lever 209 is one end of a rod 212 (Figs. 1 and 22), it being clevised for rocking movement over this end of lever 209 and in pinned relation thereto. Rod 212 extends outward from lever 209 for purposes hereinafter described. The further purpose of levers 209, 202 etc. will be more fully described hereinafter.

Extending upward, bracket 204 terminates, at its upper end, in a pair of bosses 213 to which is fastened, by screws (not shown), one end of a rail 214. This rail extends out any required amount, depending on the length of stock to be cut and if too long can be supported at its outer end by a suitable standard. This standard is not here shown or otherwise described, this being evident to one skilled in the art. Screwed to the rail at various points along its length are deflectors 215, each deflector containing at its end, nearest the rail, a bearing into which is mounted, for rocking movement, a shaft 216. (Figs. 24-26 and 22-23). Fixed to the shaft for rocking movement therewith are a series of arms 217 (Figs. 22-24-26) each arm being fastened to one end of a pan 218. The arm 217 nearest bracket 204, is located between the bosses 213 and contains an extension 219 that terminates at its outer end in a pinned connection with one clevised end of a link 220. The opposite end of this link is in pinned clevised connection with the top end of a rod 221. The lower end of rod 221 is in pinned connection with the upper clevised end of link 222, the lower end of the link being clevised over a pinned connection at the outer end of a lever 223. Rod 221 is formed in two sections, a turn buckle 221—a (Fig. 1) having right and left hand threads being placed intermediate its ends so that adjustment in its length can be easily made. Extending within bed 81, the lever 223 is keyed to a shaft 224, trunnioned for rocking movement in bearings extending from bracket 196' and from a wall of bed 81 (Figs. 1-27-4). Extending upward from, and also keyed to shaft 224 is a second lever 225, the opposite end of this lever terminating in a clevis, in which is mounted for rotation about a pin 226, a roller 227, adapted to bear on the face of cam 174. Cam 174 is so designed that when in its position as shown in Fig. 27, the pans 218 will be in the position shown in Fig. 22.

The operation of these pans 218 are as follows: As the table 82 begins to move, the vise jaws clamp the stock, then saw 89 descends, cutting the stock at a point between the jaws, (Fig. 1). The table continues ahead for a distance, the jaws release, the cut stock in the meantime being pushed over onto the pans 218. The pans have, during this rotation of shaft 51, remained elevated to the position shown in Fig. 22. The oncoming end of the next piece of stock serves to abut with the cut piece, pushing it farther onto the pans. The continued rotation of shaft 51 then brings cam 174 in correct position to permit the pans 218 to fall to the position shown in Fig. 24. Stock disposed on the pans now is deposited onto the deflectors 215 from which it rolls by gravity. Continued rotation of the shaft then causes cam 174 to bring the pans back to the position shown in Fig. 22. I have here shown short sections of pans but it is evident that any desired length can be used, depending on the average lengths of stock being cut.

While I have shown in this disclosure a trigger contacting at the outer end of the stock, for control of the dog 61, yet it is evident that measuring rolls could be applied so as to roll upon the stock as it feeds into the cutter. Then at a predetermined number of revolutions of the measuring roll, or fraction thereof, the measuring roll movement thru a mechanical hook-up may be arranged to release dog 61 in a manner apparent to one skilled in the art. I have not shown these measuring rollers or otherwise described them as this is an evident alternative to a trigger contacting with the end of the stock, for one skilled in the art.

Mounted on the rail 214, Figs. 28-31 for manual adjustment therealong is a bracket 229. Set screws 230 are threaded thru this bracket and abut in a groove along the upper edge of the rail 214, a tightening of these screws serving to retain the bracket in a fixed position. Extending between two projecting lugs 231 on the bracket are shafts 232, fixed at their ends in these lugs. Arranged for reciprocal movement on these shafts is a block 233 (Figs. 28-29). Passing thru this block is the rod 212, this rod being adjustably fixed to the block by the clamping effect of a cap 234, secured thereupon by screws 235. It is now evident that when block 233 is moved along the shafts 232 that this movement will be imparted to lever 209. Trunnioned for rocking movement about a pin 236 bearing in the block 233 is one end of a trigger 237 (Fig. 30). At a point on the trigger near the pin 236 is fastened one end of a coil extension spring 238, the opposite end being connected to the block 233. A stop pin 239 extends up from the block to interfering contact with a boss 240 extending from the trigger 237 so that the spring normally holds the trigger in the position shown in Fig. 30. When in this position boss 240 abuts at its one side with one end of a dog 241, the opposite end of the dog being pressed against by one end of a coil compression spring 243, the opposite end of the spring seating in the bottom of a hole in block 233. The dog 241 is mounted for rocking movement about a pin 242 extending thru and having bearing support in adjacent walls of the block 233. A stop pin 243—a, extending from the adjacent wall of block 233 into interfering contact with dog 241, limits the distance to which spring 243 can push the one arm of the dog. Trigger 237 extends into and across the pan 218 so as to present an interference to the stock traveling thru the pan, and the operation of this trigger and its associated mechanism is as follows:

Stock travels over table 82, thru vise jaws 166 and onto pans 218 in the direction of arrow 244, (Fig. 30). As soon as the end of the oncoming stock strikes the trigger 237 it forces the assembly consisting of block 233, trigger 237, dog 241 etc. to slide along shafts 232 a sufficient distance to cause rod 212 to pull the top end of lever 209 forward, this action lifting the lower extension of the lever 209 out of engagement with block 207 leaving the coil extension spring 245 (Fig. 1) free to pull lever 192 down, this action pulling on rod 196, the lower end of lever 202 and causing lever 202 to assume the positive position shown in Fig. 51. This action of spring 245 now pulls down rod 190 (Fig. 1) causing the slot at its upper end to contact at its outer edge with pin 189 (Fig. 14) this pulling dog 61 from its full line position to its dotted position, rollers 55 now operatively contacting for driving relation between their associated clutch members. Shaft 51 now starts to revolve.

During this forward travel of the block 233 (Fig. 30) the stock by contacting on the side of trigger 237, presses boss 240 against the dog 241, thus forming a lock around and with pins 236 and 242 and by virtue of which forward travel of the block 233 is made possible. Extending threaded thru one lug 231 is an adjustable screw 246 locked in position by nut 247 (Fig. 30). As the block 233 is moved forward on the shafts 232, the one end of dog 241 approaches the inner end of the screw 246. Continued travel of the block brings the dog 241 and screw 246 to relative positions as shown on Fig. 32, in which position the dog has been released from contact with boss 240 of the trigger 237. The stock passing thru the pans 218 is now free to push trigger 237 aside until finally the trigger can assume the position indicated in Fig. 31.

Rotation of shaft 51 shortly after it starts, brings cam 180 into contact with roller 197 on lever 195. This lever 195 has traveled from its full line position to its dotted line position (Fig. 11) during the movement of shaft 193 incident to a tripping of the dog 61. Rotation of shaft 51 now causes cam 180 to move the lever 195 from its dotted position back to its full line position, this movement pushes rod 190 up, permitting spring 188 to pull dog 61 back to interfering relation with lug 60 and against stop pin 402. This movement also returns lever 202 to the full line position shown in Fig. 23, the block 207 revolving about pin 206 so as to clear the lower projection of lever 209, and finally the block 207 is pulled again to its position indicated in Fig. 23 by spring 208. Coil spring 262, Fig. 51, has in the meantime returned lever 209 to its position in Fig. 23, the associated rod 212 also returning block 233 and associated mechanism to its original position on shafts 232. Spring 262 is prevented from pushing lever 209 too far by abutment of the lever with a stop pin 400 extending from the bracket 204. The dog 241 is now out of interference with screw 246 and as soon as the pans 218 drop to release the stock interfering with the trigger 237, the spring 238 will return the trigger to its original position against stop 239 (Fig. 30).

During this return of trigger 237 from position in Fig. 31 to position in Fig. 30 the boss 240 will strike end of dog 241 and as spring 238 is stronger in tension than the load exerted by spring 243, the dog will revolve sufficient to permit boss 240 to pass by. The spring 243 will reset dog 241 against its stop pin 243—a as soon as spring 238 has reset trigger 237 against its stop pin 239. The entire mechanism is now reset and ready for a next cutting operation which will occur as soon as the oncoming end of the next piece of stock contacts with trigger 237. The purpose of confining trigger 237 so that it travels with block 233 straight along the pan 218 until after clutch dog 61 is tripped is to avoid the variable contact angles that would result if the stock hit a trigger that acted as a lever about a pivot incident to its clutch trip releasing operation. This straight movement of the trigger along the pan 218 is conducive to a greater accuracy in length of cut.

Summing up, the complete operation of this mechanism is as follows: Stock 20, coming from a source, passes over table 82, thru jaws 166, onto pans 218, where it contacts with the trigger 237. This pressure on the trigger then trips the clutch dog 61, permitting shaft 51 to revolve. Table 82 now moves by action of cams on shaft 51 at a rate of speed equal to the feeding speed of the stock. Vise jaws 166 lock onto stock and saw 89 descends by cam action, cutting the stock held between the vise jaws. The cut piece now is pushed out onto the pans 218 and is released by action of cam 174 dumping pans 218 and permitting the stock to roll out onto the deflectors 215, the pans being returned by cam action to receive the next oncoming piece of stock. Trigger 237 is now reset, and new clutch trip releasing energy restored in spring 245 by cam action on lever 195. The table 82 returns to its starting position and all parts assume their initial at rest position, which is held until the next piece of stock again trips the trigger 237, when again the cycle is repeated.

To adjust for variable lengths, the screws 235 and 230 are loosened permitting a sliding of member 229 along the rail 214 to the desired new position. Then screws 235 and 230 are re-tightened.

As an optional method of driving the saw 89 up and down I have shown in Fig. 33 a crank 245—a driven by shaft 51, the crank replacing cams 105, 180 and lever 94. Link 92 is now shown connected to the crank arm and upon rotation of the crank in direction of arrow 246—a, the pin 93 will trace a modified elliptical path. All other members of the mechanism remain as previously described.

In Figs. 34 and 35, a modified method of supporting the table 82 is shown. Extending from bed 81 are arms 247—a and 248. Upon a pin 249, is mounted for rocking movement, the upper end of a link 250. The lower end of the link is arranged for rocking movement about a pin 251 extending from bosses each side of a lever 252 at a point intermediate its ends. To the lower ends of levers 252 are pinned for rocking there about one end of links 253, the opposite ends of the links being pinned for rocking movement by pins 255 to bosses 254 extending in from the associated walls of bed 81. The pins 255 and 256 extend thru the lever and the links and thru the boss and the links. The lever 252 extending upward terminates in a pinned connection to lugs 257 extending from the under side of table 82, being connected thereto for rocking movement on pins 258. Two sets of these linkages 250, 252, and 255 are used; one to support each end of table 82. Also each lever 252 is connected at two points at each end of the table, (Fig. 34) so that the table is carried at four points. The operation of the mechanism is all otherwise as shown in Figs. 1 and 4 etc. The only change being in the elimination of gibs 83 (Fig. 4) and the supporting ways also therein shown. The operation of the table support disclosed in Figs. 34 and 35 is as follows: As the table is moved forward by the cams on shaft 51 the pins 258 move substantially in a straight line, the weight of the table being on pins 251 which now move in an arc about pivot 249. The pin 256 moves in an arc about pivot 255. This movement produces a line of travel to pins 258 that is for all practical purposes in my mechanism satisfactory.

Referring to Figs. 36, 37, and 38. Here I have shown a different way of reciprocating table 290, the equivalent of table 82 in Fig. 1. The shaft 51 and its associated driving mechanism remain in principle the same as shown in Fig. 1. However the cams 127, 128, 105, 180 shown on the shaft 51 (Figs. 1 and 4) are now replaced by one cam 291 (Fig. 36). This is a double acting cam, a path 292 being cut into one of its sides, so that rollers 311 and 325 operatively engaging the path, are acted upon for movement in both directions. Pivoted for rocking movement about a pin 293 fixed into a boss 294, extending from the bed 295—a is the lower end of a lever 295. At its upper end is a boss thru which at each side extends a pin 296. Mounted at each side of this boss for rocking movement on these extensions are one end each of links 297. The opposite ends of these links have a pin 298 extending therethru, a roller 299 being arranged to rotate upon the pin and between the inner surfaces of the links 297. Pin 298 extends past each link bearing at either end in bearings formed at each side of a slide 300 (Figs. 36-37). Reciprocally yoked over the roller 299 are descending arms of a lever 301. These arms unite at the top in a boss thru which extends a shaft 302, the shaft being keyed therein, and extending for bearing support thru a pair of lugs 303 extending downward from the under side of the table 290. The shaft continues to the opposite side of the table and is carried at this outer end in another bearing formed in the table. Intermediate its ends is keyed one end of a lever 304, the opposite end of this lever terminating in a ball seat wherein bears one end of a link 305. The opposite end of the link 305 bears in a ball seat at the lower end of an adjusting screw 306. The link terminates at each end in a ball, which seats in its respective seat and which is held therein for swiveling ball movement by a split cap 307. These caps 307 are arranged to be placed in halves around their associated ends of the link, one set of halves being fastened by screws, (not shown) to lever 304, the other set of halves, to the associated end of screw 306. This ball joint connection, formed by this link, etc. is only shown in Fig. 36, as a more detailed view would hardly be necessary, the procedure being a very evident and common one. Screw 306 passes upward in threaded contact thru a bracket 308, the outer end of the screw having a jam nut 309 for locking the screw in fixed positions in the bracket. The purpose of this screw 306 is to adjust lever 301 for a purpose and in a manner as hereinafter more fully described. Extending rearward at an angle from pin 298, slide 300 is guided for reciprocation in slide ways formed in a bracket 309 fastened by screws, not shown, to a wall of bed 295—a. Intermediate its ends lever 295 has a pin 310 extending from its side adjacent the cams 291. Mounted for rotation on the pin is a roller 311. This roller extends into and is guided by the walls of cam path 292. The operation of this portion of the device is as follows. Upon rotation of cam 291 the roller 311, contacting with path 292, causes lever 295 to move about its pivot 293, the upper end swinging about the arc between points 312, 313 Fig. 38. Link 297 is shown in Fig. 38 as line between points 314—312. As cam 291 revolves in direction of the arrow 320, the upper end of the lever at 296 moves from point 312 to 313 and back again and link 297 pulls the roller 299 and slide 300 along this angled line passing thru points 314 and 319. This reciprocal movement is now imparted to the lever 301 and thru its connection to shaft 302, to table 290. In imparting this reciprocal movement to the table the roller 299 moves in a line parallel to the center of the slide 300, while the table receives reciprocation along a line parallel to the top of this bed. During this travel forwardly pin 298 approaches the shaft 302 and vice versa on the return. In other words at the relative positions shown in Fig. 38 the table travel is a little less than the travel of the roller. Then if the screw 306 is screwed into its down position, the center line of the lever 301 will be moved from line 314, 315 (Fig. 38) to line 318—314. In this position the travel of the table will be a little greater than this travel of the roller. It is evident that adjustment of the screw 306 can be made to give table travel between the length of lines 315—316 or 318—317. The variance is the amount indicated at 321 (Fig. 38). By this adjustment I control the feet per minute travel of the table for the purpose and function as hereinbefore described for adjustment of nut 116 (Fig. 6).

For the controlling of the rise and fall of the saw 89, (Fig. 36) I employ the following means. To a shaft 322 is keyed one end of a lever 323 the opposite end containing a pin 324 onto an extending portion of which is mounted for rotation a roller 325. This roller extends into and contacts operatively with the path 292 of the cam 291. From each side of this lever 323 the shaft 322 extends into bearings formed in the bracket 309, this shaft at its one end continuing thru the bearing into keyed relation to one end of a lever 326. To the opposite end of lever 326 is pinned for rocking movement one end of a link 327, the opposite end terminating in pinned rocking relation to one end of a lever 328, mounted for rocking movement on a shaft 329 extending from a portion of the table 290. To the opposite end of lever 328 is pinned for rocking movement the lower end of a link 330, the opposite end being held for rocking movement by pin 93 in member 91. The further description of member 91 motor 87, saw 89 and associated portions shown in Fig. 36 is as hereinbefore described for the same members as shown in Fig. 1. The operation of this mechanism is as follows: Upon a rotation of cam 291 the table 290 receives forward reciprocation. At the same time lever 323 is pulled downward by roller 325, and this movement thru lever 326, link 327, lever 328 and link 330 pulls the motor 87 and saw 89 downward. The path 292 of the cam is so proportioned that during one revolution thereof the pin 93 will trace an elliptical line as indicated at the top of Fig. 38. The center lines of members 327, 328, 330 are indicated on Fig. 38 in a part of the various positions they take during each cycle of cam operation. In Fig. 36 I do not show the vise jaws 166 and their associated supporting and operating mechanism. Neither do I show the trigger, the unloader, or any of the driving members thru which rotation is imparted to shaft 51. However it is evident that a further description of the complete operation of this optional form of certain parts of my invention would include these vise jaw parts substantially in the same manner and form as hereinbefore described for their use in Fig. 1. Also that stock will be fed thru beneath the saw 89, cut thereby in predetermined lengths, unloaded, etc. all substantially in the same manner as obtained thru the use of the mechanism of Fig. 1. As an optional form of driving the saw 89 thru the stock I have shown a mechanism illustrated in Figs. 46, 47, and 48. All the associated driving mechanism is substantially the same as shown in Fig. 1, except: That I have eliminated cams 180, 105, lever 94, link 92. These are the members serving to pull the saw 89 down during each cutting operation of the mechanism. To replace these I use a motor 335 (Fig. 46) connected by coupling 336 to a worm shaft 337, onto which is fixed for rotation therewith a worm 338, meshing with a worm gear 339 (Fig. 47). The shaft 337 passes for support thru bearings formed in the lower portion of a gear box 340. In the upper part of this gear box are formed bearings in which a shaft 341 is supported. To shaft 341, intermediate its ends, and inside of the box, is fixed for rotation therewith the worm gear 339. Extending at one end of this gear box the shaft has keyed thereto one end of a crank arm 342. The other end of this crank arm carries a pin, which projects at one side forming a bearing upon which is mounted for rotation the lower end of a link 343. This link extending upward, connects thru pin 93 with member 91, for this same purpose hereinbefore set forth, for operation of motor 87 and associated saw 89, as described in connection with Fig. 1. Extending thru the gear box at the side opposite this crank arm 342, the shaft 341 has keyed thereupon a switch drum 344. This drum is made of suitable electrical insulating material and has fixed to its outer periphery a metal contact ring, 345. This ring is segmental, a gap being formed at one portion thereof. Arranged to ride upon the ring are a pair of contact fingers 346 (Figs. 46–48). These fingers are fastened to an insulating block 347, carried on a member 348, formed as an extension from one wall of the upward extending portion 349 of the table 350. Upon shaft 51 is keyed a second drum switch 351 of insulating material upon which is fixed a contact ring segment 352 (Figs. 46–48). Arranged to ride on switch 351 are a pair of contact fingers 353, these being mounted onto an insulating block 354, carried on a member 355 extending from and forming a part of this bed 81.

In Fig. 46 I have merely indicated the vise jaws 166, and I have not shown their supporting and operating mechanism. Neither do I show, the trigger the unloader, or any of the driving members thru which rotation is imparted to shaft 51. However it is evident that this description of the operation of these parts of my invention would be substantially in the same manner and form as hereinbefore described for their use in Fig. 1. Also that stock will be fed thru beneath the saw, cut thereby into predetermined lengths, unloaded etc. All substantially in the same manner as obtained thru the use of the mechanism of Fig. 1. The operation of this optional saw drive is as follows: Upon a start of operation of shaft 51, contact ring 352 is rotated to contact with fingers 353 closing an electrical circuit to motor 335, (Fig. 48). Worm 338 and gear 339 now receive operation, and crank arm 342 revolves, lowering link 343 and associated motor 87. Upon a partial revolving of shaft 341, switch ring 345 approaches and then closes a second electrical circuit to motor 335 thru fingers 346. The first circuit closed thru fingers 353 is now broken by continued rotation of shaft 51, and motor 335 then continues to revolve independent of shaft 51 until one complete revolution is made of crank 342. As soon as one revolution is made, fingers 346 ride off contact on ring 345, this breaking the second circuit to the motor, the cycle being now completed. In this operation as described it is evident that pin 93 receives a motion similar to that shown by the crank drive in Fig. 35. It is evident that if I depended on fingers 353 only to start and stop the cycles of motor 335 that crank arm 342 would generally either rotate a little short of 360° or it might go a little more. In a short time the mechanism would be out of time and inoperative. By providing this dual control the crank arm 342 is compelled to go one revolution at each operation thereof, independent of shaft 51.

In Figs. 43, 44, 45 I have shown an optional form of feeding and driving the cutting mechanism. All of the operative portions of the mechanism are substantially the same as shown in Fig. 1. However, I have shown shaft 23 lowered for connection to a motor 360, and I have called this shaft (23) by the new number 361 to avoid confusion with the description for Fig. 1. This shaft carries worm 24, driving gear 30 etc. in the same manner and for the same purpose as in the arrangement shown in Fig. 1. This shaft extends out from bed 81 and is connected to the motor 360 thru a coupling 362. The motor is fastened to a bracket 363 by screws (not shown) this bracket extending out from the bed 81 and held thereon by screws (not shown). It is evident that when current is applied to the motor that shaft 361 will revolve and that rotation will be applied to gear 42, as hereinbefore described for Fig. 1. To feed the stock into the cutter I have here shown (Fig. 43) a cradle reel built as follows. A pair of side plates 364, each having one end and their lower edge flanged are spaced apart to accommodate rollers 365, bearing on pins 366 each end of the pins extending past the rollers and fixed in its associated side plate 364. Screws thru the flanges adjacent the bed 81, serve to hold the plates to the bed and also to maintain the plates 364 at their correct spaced relation one to the other. Other screws (not shown) can be used to hold the lower flanges to the floor. The purpose of this cradle reel is to provide a support for a coil of stock 368. The coil rests on the rollers 365 and between the plates 364, it being guided thereby for rotation on its outer periphery. The further purpose of the cradle reel is more fully explained hereinafter. Fastened by screws (not shown) to bed 81 is a bracket 369, it extending rearward and upward from the bed. A pinch roll 370 is fixed to a shaft 372, extending thru and supported in bearings formed in the side walls of the bracket. Shaft 372, continues past its one bearing and has fixed onto its outer end a sprocket 374 (Fig. 45). Shaft 373, has fixed thereupon a pinch roller 371, the shaft extending thru and bearing in blocks 383 (Fig. 45). These blocks are guided for vertical reciprocal movement in guides formed at the upper side of bracket 369. A cover plate 385 extends across the top of this bracket, it being fastened thereto by screws, (not shown). Adjustment screws 384 are threaded thru the plate and abut at their lower ends with the top of the blocks 383, for a purpose hereinafter more completely described.

The worm gear 30 is keyed to a shaft 375, which is the equivalent of shaft 31 of Fig. 16, with the exception that its one end projects thru the worm gear housing and carries fixed thereupon a sprocket 376. A chain 377 connects the two sprockets so that when rotation is present in shaft 375, shaft 372 is also rotated. Fixed to shaft 372, adjacent the one side of the roll 370 and between the walls of the bracket 369, is a spur gear 378. This meshes with a spur gear 379 fixed in a similar manner to shaft 373. The purpose of this chain drive and pinch rollers, is to receive the free end of the stock of the coil 368, and carry it to and thru the cutting mechanism. As the coil 368 may consist of heavy material it will be found necessary at times to provide straightener rollers. I have indicated these rollers 380 (Fig. 43) fixed to shafts 381. Gears 382 are also fixed to the shafts 381 the gears, shafts, and rollers having a relation with each other, similar to that of Fig. 45. The one gear 382 meshes with gear 378, so that when rotation is applied to shaft 372, all the shafts 381 also rotate. The two uppermost shafts 381 are mounted in blocks 383, similar in all respects to the mounting shown in Fig. 45. The other and lower shafts 381 are carried in bearings formed in the side walls of the bracket 369. The downward pressure of roller 371 is adjustable thru use of screw 384 so as to vary the pressure on the stock between this roll and roller 370. The four rollers 380 form a set of straightening rollers. The lower two being not adjustable up and down, and the upper two being adjustable vertically by means of screws 384. The relation of the rollers 380 can therefore be regulated one to the other to form a straightening means. The operation of this form of the cutting mechanism is as follows:

A coil of stock 368 is placed in the cradle reel, and its one end passed between rollers 380, and between rollers 371 and 370. Adjustment of one screw 384 is now made to give the desired pulling effect to the rollers 370 and 371. These rollers pull the stock from the reel and push it into the cutting mechanism, over the table 82, between vise jaws 166 and out onto the unloader, (Fig. 1 etc.) where it trips the clutch dog 61 (Fig. 14) causing the start of a cutting operation, the same as described for Fig. 1. Operative movement is imparted to the cutter by the electric motor 360. Power is applied to the rollers 371, 370 and 380 by the chain drive 377. The cradle reel, straightening rollers and pinch rollers are in themselves of a form common in the art to which my invention appertains and familiar to all skilled in this art. A more detailed description or illustration has therefore not been thought necessary. This arrangement has been shown to bring out the character of an individual drive arrangement as applied to my cutting mechanism.

I wish to call attention to the saw motor 87, as shown in all applications thereof. This motor is wired independently and receives electrical impulse by means of any conventional hand thrown switch. It therefore rotates at all times independent of the balance of the mechanism. When it is desired to cease cutting stock, the switch controlling this motor circuit is hand thrown to open the circuit. This switch, has not been shown, neither has any wiring diagram for the motor, as this is merely an incidental conventional control for continuous operation of the motor 87.

Figure 54:
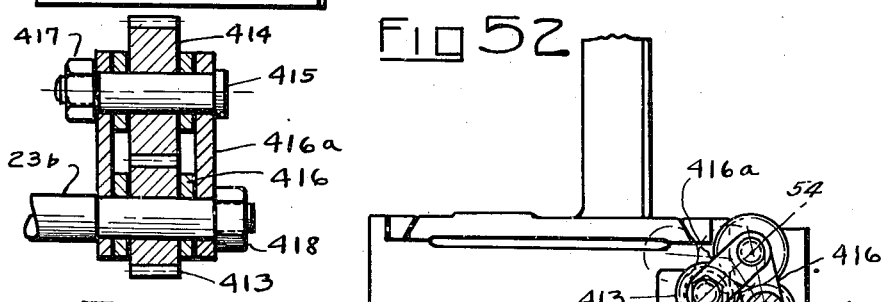
Fig. 54 is a section along the line 54—54 in Fig. 53 with portions removed.
Figure 53:
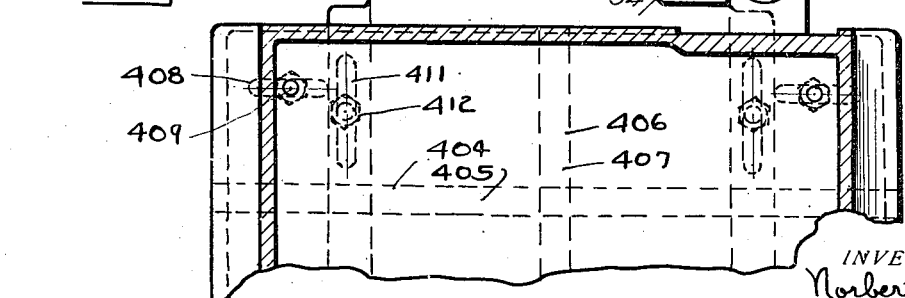
Fig. 53 is a section taken along the line 53—53 in Fig. 52, portions being removed.

In Figs. 54, 55, and 56 I have shown a method whereby adjustment of the entire cutting mechanism can be made up or down, or sideways, relative to an associated rolling mill. The entire operation and design of the arrangement shown in Fig. 54 is the same as for the mechanism shown in Fig. 1 with this exception. I have shown a plate 403 interposed between the beds 81 and 1. The plate has a groove 404, wherein slides a tongue 405, formed as a part of the end of the bed 81. Another groove 406 at the opposite side of the plate guides for movement therein a tongue 407 formed in the end of the bed 1. Slots 408 are formed in the plate 403, thru which pass screws 409, these being threaded into the end of bed 1. These screws clamp the plate against the end of the bed. Similar slots 411 are formed in the end of bed 81. Thru these pass screws 412, threaded into the plate 403, for the clamping of the bed 81 against the plate. It is evident that I depend on the gripping effect of the screws 409 and 412 to hold the bed 81 in the position shown, but that the co-acting faces of the beds 1 and 81 and the plate 403 could be serrated to offer additional gripping effect. Serrated surfaces are not shown however as this is evident to one skilled in the art. It is now evident that when screws 409 are loosened that bed 81 can be adjusted sideways, and that when screws 412 are loosened that up and down adjustment can be made. To carry the drive from the rolling mill to my cutting mechanism I have shown shaft 23, cut into two sections, one 23—a extending from the mill, and one 23—b extending from the bed 81. To the outer end of each section is fixed a gear 413. Meshing with these gears is an idler gear 414, arranged for rotation on a pin 415. A pair of links 416 bear at one of their ends on shaft 23—a, and at their opposite end on the pin 415. Another pair of links 416—a bear at their one end on shaft 23—b and at their opposite end on the pin 415. Nuts 417, 418 and 419 serve to retain the assembly of links, shafts, and gears, one with the other, so that the idler 414 has free rolling movement between the pair of gears 413. It is evident that as the bed 81 is moved sideways or up and down that the shaft 23—b will follow the adjusting travel while the shaft 23—a remains at rest, the power connection between the two shafts remaining due to the linkage 416 and 416—a and idler gear 414. Drive is imparted to the shaft 23—a from shaft 3 of the mill the same as in Fig. 1, and the power thus transferred to shaft 23—b is given to worm 24 and its associated mechanism for the same purpose and effect as described hereinbefore for Figs. 1, 16 etc.

I also which to call special attention to my present disclosed roller clutch, consisting of members 43, 45, 55 etc. While I have shown this form of roller clutch, yet any clutch whereby a substantially uniform engagement between the driving and driven members can be had could be used. Clutches having a variable time lag between the tripping and the actual power pickup cannot be used, on account of the inaccuracy in lengths of cut. This is evident, as in my present disclosure the stock continues its travel thru the cutting mechanism during the cutting cycle and if variable time amounts are present between the tripping and the power pickup this would result in varying amounts of stock passing thru the cutter after the tripping and prior to actual start of the cutting cycle. It is also evident that in my disclosure I have provided a clutch having a consistent and uniform instant engagement and that I have reduced this time lag to the very minimum at the same time keeping the time lag of each operation of any cutting cycle substantially the same in amount as the time lag of preceeding operations.

My combination of a cutting mechanism, operable to cut moving stock without a stopping thereof, with tripping and power pickup means operable to operate substantially and consistently instantly, comprise a combination that produces a commercial cutter, that to my knowledge and belief has never before existed. My application of uniform power pickup produces new and useful results, even though a portion of the mechanism involved does consist of old elements. Without using the principle underlying my method of operation it is not possible to obtain, speed, accuracy etc, in length of cut. I wish it understood that various clutches providing they produce a substantially consistent and instant power engagement can be used in place of the one I show, but that their use would not involve any departure from my invention. I also wish it understood that the saw 89 can be a toothed disc saw, an abrasive disc, or any cutting means operable to cut thru the stock, without involving any departure from my invention. Also that in place of the saw 89 and motor 87, that an electric arc cutter could be mounted onto the slide 85. In this case suitable controlling switches could be operated from shaft 51.

I also wish it known that in place of the mechanical trigger arrangement shown on Figs. 28 to 31 inclusive, that an electrical control can be substituted. An electric control might be of advantage for certain forms of stock; that is the end of the stock would control a circuit for electrically controlling the dog 61. Also the table 82 can be made to reciprocate by hydraulic means, and also a hydraulic transmission can be employed to pull the saw down. However, their usage would not involve a departure from my claims.

I also wish it understood that the particular machine and the different parts thereof illustrated and described are merely a typical embodiment of certain forms of my invention and that the specific construction described herein is merely by way of illustration and not by limitation or narrowing of my claims as obviously changes in construction and design can be made without departing from my invention, and obviously also, various of the features described and illustrated can be omitted leaving the machine still operative to usefully do certain of its work as described and that such changes are contemplated by me and would not involve any departure from my invention.

Having thus described my invention what I claim as new and desire to secure by Letters Patent is:

1. A cut-off machine for cutting off moving stock, comprising, a support, a carriage slidably mounted thereon, a rotary saw mounted for vertical reciprocation on the carriage, a cam shaft rotatably mounted in the support, a plurality of cams fixed to the cam shaft, a member pivotally hanging from the carriage, a pair of cam rollers pivotally mounted on the member and contacting certain of the cams on the camshaft to effect the reciprocation of the carriage, a screw attached to the member, a trunnioned nut threaded on the screw, a linkage pivotally connecting the trunnioned nut to the support, the said screw, trunnioned nut, and linkage being arranged to adjust the speed of reciprocation of the carriage.

2. A cut-off machine for cutting off moving stock, comprising, a support, a carriage slidably mounted thereon, a rotary saw mounted for vertical reciprocation on the carriage, a camshaft rotatably mounted in the support, a plurality of cams fixed to the camshaft, a member mounted in operative relation to the camshaft, a cam roller rotatably mounted on the member and contacting certain of the cams on the camshaft, a screw attached to the member, a trunnioned nut threaded on the screw, a linkage connecting the trunnioned nut to the support, the said member, cam roller, screw, trunnioned nut, and linkage, being arranged to effect the uniform reciprocation of the carriage.

3. A cut-off machine for cutting off moving stock, comprising, a support, a carriage slidably mounted thereon, a rotary saw mounted for vertical reciprocation on the carriage, a camshaft rotatably mounted in the support, a plurality of cams fixed to the camshaft, a member pivotally hanging from the carriage, a pair of cam rollers pivotally mounted on the member and contacting certain of the cams on the camshaft to effect the uniform reciprocation of the carriage, a lever pivotally mounted in the housing, a link connecting the lever to the rotary saw, a pair of cam rollers pivotally mounted on the lever and contacting certain of the cams on the camshaft to effect the vertical reciprocation of the rotary saw, a screw attached to the said member, a trunnioned nut threaded on the screw, a linkage connecting the trunnioned nut to the support, the said screw, trunnioned nut, and linkage being arranged to adjust the speed of reciprocation of the carriage.

4. A cut-off machine for cutting off moving stock, comprising, a support, a carriage slidably mounted thereon, severing means mounted on the carriage, a camshaft rotatably mounted in the support, a plurality of cams fixed to the camshaft, means associated with certain of the cams to effect the operation of the severing means, a member pivotally hanging from the carriage, a pair of cam rollers pivotally mounted on the member and contacting certain of the cams on the camshaft to effect the uniform reciprocation of the carriage, a screw attached to the member, a trunnioned nut threaded on the screw, a linkage connecting the trunnioned nut to the support, the said screw, trunnioned nut, and linkage being arranged to adjust the speed of reciprocation of the carriage.

5. A cut-off machine for cutting off moving stock, comprising, a support, a carriage slidably mounted thereon, a rotary saw mounted for vertical reciprocation on the carriage, a camshaft rotatably mounted in the support, a plurality of cams fixed to the camshaft, a member pivotally hanging from the carriage, a pair of cam rollers rotatably mounted on the member and contacting certain of the cams on the camshaft to effect the uniform reciprocation of the carriage, a screw attached to the member, a trunnioned nut threaded on the screw, a linkage connecting the trunnioned nut to the support, the said screw, trunnioned nut, and linkage being arranged to adjust the speed of reciprocation of the carriage, a mechanism acted upon by certain of the other cams to effect the reciprocation of the rotary saw, a driving source, and a clutch to connect the driving source to the camshaft.

6. A cut-off machine for cutting off moving stock, comprising, a support, a severing means mounted thereon for reciprocable movement, a camshaft rotatably mounted in the support, a plurality of cams fixed to the camshaft, mechanism located between certain of the cams and the severing means to effect the reciprocation and actuation thereof, a driving means for the camshaft, an overrunning clutch to engage the driving means to the camshaft, a detent to control the engagement of the overrunning clutch, a trigger mounted in the path of the moving stock, a carriage to support the trigger, the said trigger and carriage being arranged to move in a parallel relationship with the stock when the trigger is contacted by the moving stock, and a trigger rod arranged between the said carriage and the said detent to effect the actuation of the detent during the movement of the carriage.

7. A cut-off machine for cutting off moving stock, comprising, a support, a carriage slidably mounted thereon, a severing means mounted on the carriage, a camshaft rotatably mounted in the support, means to rotate the camshaft, a cam fixed to the camshaft, a member mounted in operative relation to the camshaft, a cam roller rotatably mounted on the member and contacting the cam to effect the reciprocation of the carriage during rotation of the camshaft, a second member mounted on the said first member in adjustable relationship with the cam roller, a mechanism connecting the said second member with the support, the said first member, second member, and mechanism, being arranged to adjust the speed of reciprocation of the carriage.

8. A cut-off machine for cutting off moving stock, comprising, a support, a carriage slidably mounted thereon, a severing means mounted on the carriage, a drive shaft rotatably mounted in the support, means to rotate the drive shaft, a member mounted in operative relation to the drive shaft to effect the reciprocation of the carriage during rotation of the drive shaft, a screw attached to the member, a trunnioned nut threaded on the screw, mechanism connecting the trunnioned nut to the support, the said screw, trunnioned nut, and mechanism, being arranged to adjust the speed of reciprocation of the carriage, a second mechanism mounted in the support to be acted upon by the drive shaft for operation of the severing means during the reciprocation of the carriage in the direction of movement of the moving stock.

NORBERT RUBIN.